(12) United States Patent
Miyata et al.

(10) Patent No.: US 11,293,835 B2
(45) Date of Patent: Apr. 5, 2022

(54) LASER CONTROL DEVICE, LASER CONTROL SYSTEM, LASER DEVICE, AND LASER CONTROL METHOD

(71) Applicant: Fanuc Corporation, Yamanashi (JP)

(72) Inventors: Ryusuke Miyata, Yamanashi (JP); Hiroshi Takigawa, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 248 days.

(21) Appl. No.: 16/750,717

(22) Filed: Jan. 23, 2020

(65) Prior Publication Data
US 2020/0249120 A1  Aug. 6, 2020

(30) Foreign Application Priority Data
Jan. 31, 2019 (JP) .............................. JP2019-016101

(51) Int. Cl.
| | |
|---|---|
| *H01S 3/00* | (2006.01) |
| *G01M 11/00* | (2006.01) |
| *H01S 3/106* | (2006.01) |
| *H01S 3/067* | (2006.01) |
| *B23K 26/062* | (2014.01) |
| *H01S 3/10* | (2006.01) |

(52) U.S. Cl.
CPC ....... *G01M 11/3145* (2013.01); *B23K 26/062* (2015.10); *H01S 3/0014* (2013.01); *H01S 3/06708* (2013.01); *H01S 3/106* (2013.01); *H01S 3/10038* (2013.01)

(58) Field of Classification Search
CPC .............. H01S 3/0014; H01S 3/06708; H01S 3/10038; H01S 3/106; B23K 26/0626; G01M 11/3145
See application file for complete search history.

(56) References Cited

U.S. PATENT DOCUMENTS

| | | |
|---|---|---|
| 2004/0160662 A1 | 8/2004 | Doi |
| 2017/0220927 A1* | 8/2017 | Takigawa ............... B23K 26/21 |

FOREIGN PATENT DOCUMENTS

| | | | | |
|---|---|---|---|---|
| JP | 02055685 | A | * | 2/1990 |
| JP | 02055685 | A | | 2/1990 |
| JP | 04371380 | A | | 12/1992 |
| JP | 1038751 | A | | 2/1998 |
| JP | 2000221108 | A | | 8/2000 |
| JP | 2000314673 | A | | 11/2000 |
| JP | 2006292424 | A | | 10/2006 |

(Continued)

*Primary Examiner* — Michael Carter
(74) *Attorney, Agent, or Firm* — RatnerPrestia

(57) ABSTRACT

A laser control device includes a processor configured to control, when a control circuit of a laser device detects occurrence of an abnormality in a laser oscillator or a laser optical system and stops laser output from the laser oscillator, the control circuit based on a result of determining whether to enable or disable re-outputting of laser light from the laser oscillator by inputting, to a classifier, input data being at least a part of environmental data and state data about the laser device in a predetermined period including a stop time of laser output. Then, the state data and the input data in the predetermined period include at least one of time-series data about a light amount of laser light and time-series data about a light amount of return light propagating in a direction opposite to a direction of the laser light in the predetermined period.

15 Claims, 20 Drawing Sheets

(56) References Cited

FOREIGN PATENT DOCUMENTS

| | | | |
|---|---|---|---|
| JP | 2017131937 | A | 8/2017 |
| JP | 2018182132 | A | 11/2018 |
| WO | 2010041564 | A1 | 4/2010 |

* cited by examiner

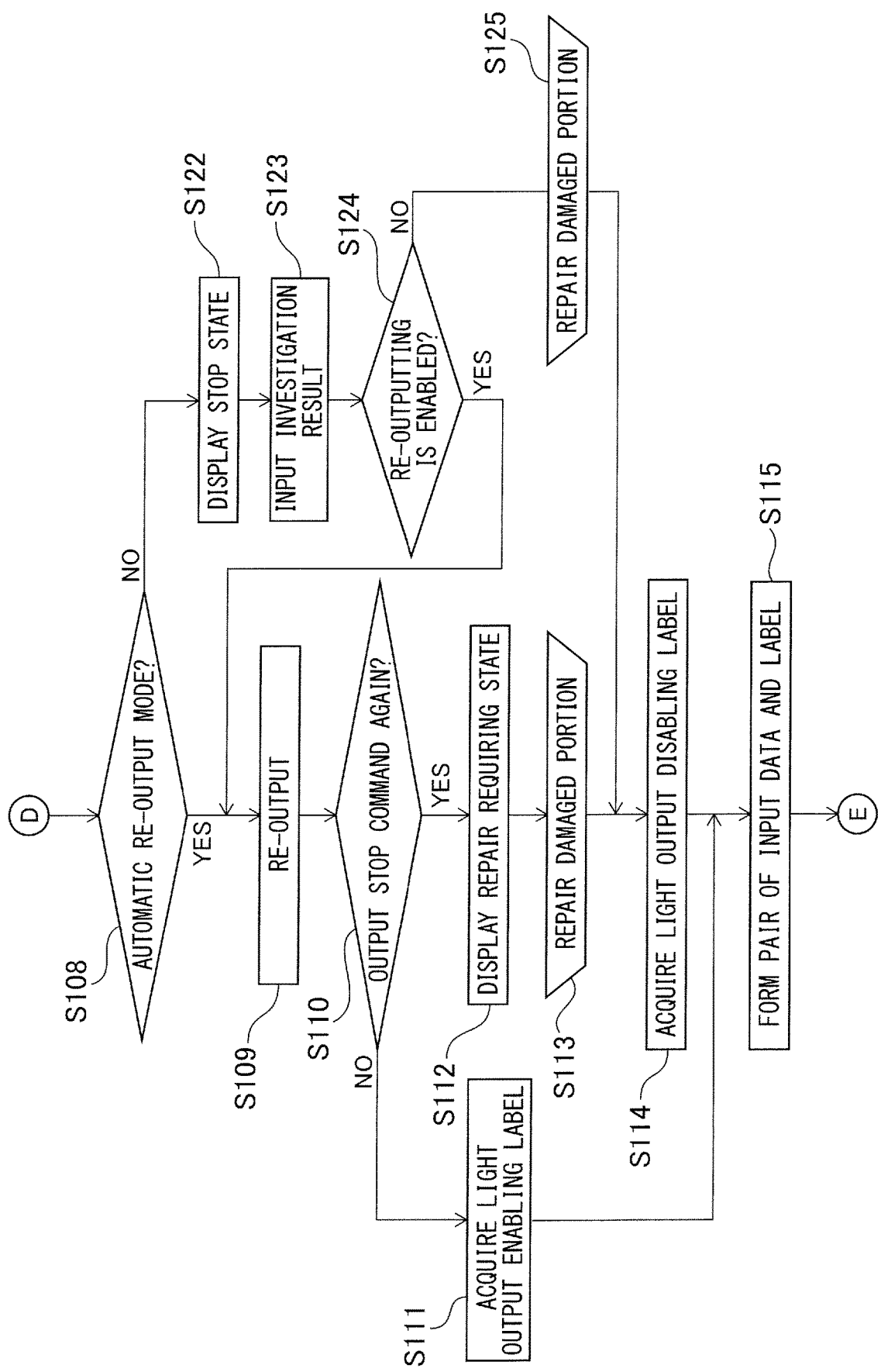

LASER CONTROL DEVICE, LASER CONTROL SYSTEM, LASER DEVICE, AND LASER CONTROL METHOD

CROSS-REFERENCE TO RELATED APPLICATIONS

This application is a new U.S. Patent Application that claims benefit of Japanese Patent Application No. 2019-016101, dated Jan. 31, 2019, the disclosure of this application is being incorporated herein by reference in its entirety for all purposes.

FIELD

The present invention relates to, for example, a laser control device, a laser control system, a laser device, and a laser control method.

BACKGROUND

In a high-output laser device for laser processing in recent years, preventing a laser optical system or a laser oscillator from being damaged by laser light reflected by a workpiece (hereinafter, which may be referred to simply as reflected light), and the like has been studied. For example, the high-output laser device for laser processing detects a light amount of laser output light emitted from the laser oscillator or return light which propagates through the laser optical system in a direction opposite to a propagation direction of the laser output light and includes reflected light from a workpiece with a photodetector that can detect the light amount in a short period, and monitors the detected light amount at an extremely short time interval. Then, when the detected light amount falls outside a predetermined range, the laser processing high-output laser device is controlled in such a way as to immediately stop laser light output. For example, in some cases, the length of time from occurrence of an abnormality in which the light amount of the return light falls outside the predetermined range and the like until the laser light output is stopped is equal to or less than several tens of µs. In this way, the time from occurrence of an abnormality until the laser light output is stopped is set to be extremely short. Thus, even when the laser processing high-output laser device detects occurrence of an abnormality and stops the laser light output, the laser oscillator and the laser optical system are not damaged, and re-outputting of laser light often has no problem.

However, the laser oscillator or the laser optical system may be slightly damaged in some cases. For example, an optical fiber for guiding laser output light to a processing head is used in the laser optical system of the laser processing high-output laser device. If the optical fiber is even slightly damaged, when the laser processing high-output laser device re-outputs laser light, a temperature of a core of the optical fiber may rise due to generation of heat caused by a loss of laser light in a damaged portion. In such a case, a so-called fiber fuse is generated, and the damaged portion rapidly expands in a direction toward the laser oscillator. Particularly, when the laser device is a fiber laser device often used as the laser processing high-output laser device, the laser oscillator is also constituted of the optical fiber. Thus, the fiber fuse may proceed to the laser oscillator, and a situation in which the expensive fiber laser oscillator is also damaged may occur. Therefore, when the laser device detects occurrence of an abnormality, based on a detection result of a light amount by the photodetector, and the like, and stops the laser light output, it is extremely important to determine whether the laser device may re-output laser light or may not re-output laser light because of expanding damage.

As described above, even when the laser device detects occurrence of an abnormality and stops the laser light output, there are many cases in which the light output may be performed again. Thus, it takes extremely many man-hours and is unrealistic to disassemble and investigate the laser device every time. Further, there is also a problem in that it is difficult to find a damaged place in a case of minor damage even by disassembling and investigating the laser device.

A technique for an inspection by passing light through an optical fiber has been proposed in order to detect damage to the optical fiber (see, for example, Japanese Unexamined Patent Publication (Kokai) No. H10-38751, Japanese Unexamined Patent Publication (Kokai) No. 2000-221108, Japanese Unexamined Patent Publication (Kokai) No. 2000-314673, Japanese Unexamined Patent Publication (Kokai) No. 2006-292424, and International Publication No. WO2010/041564). For example, Japanese Unexamined Patent Publication (Kokai) No. H10-38751 discloses an optical fiber breakage detection device which includes a lens system that condenses light from a light source to an optical fiber transmitting high-energy light at an incident end of the optical fiber, a lens system that irradiates and condenses light to a transmission destination at an emission end of the optical fiber, a photodetector that receives stray light in the lens system in the vicinity of each of the incident-end lens system and the emission-end lens system, and a detector that detects a breakage of the optical fiber by comparing outputs of the photodetectors.

Further, Japanese Unexamined Patent Publication (Kokai) No. 2000-221108 discloses an optical fiber soundness inspection device. The optical fiber soundness inspection device is applied to a laser processing device which includes a processing laser oscillator that generates processing laser light, an optical fiber that propagates the processing laser light, and a laser processing head that converges the processing laser light radiated from the optical fiber and irradiates an object with the processing laser light. Then, the optical fiber soundness inspection device includes an inspection laser oscillator that generates inspection laser light having a wavelength different from that of the processing laser light and a photodetector that detects the inspection laser light. The optical fiber soundness inspection device introduces inspection laser light into the optical fiber, measures the inspection laser light returning from the laser processing head with the photodetector at a position near a laser light emission end of the optical fiber, and detects an abnormality of the optical fiber.

Further, a method of detecting a disconnection of an YAG laser fiber disclosed in Japanese Unexamined Patent Publication (Kokai) No. 2000-314673 detects a disconnection of an YAG laser fiber by comparing presence or absence of a laser output signal incident on the fiber with presence or absence of a laser detection signal emitted from the fiber. The method leads return light on an emission side to the vicinity of an incident side, detects the return light at the terminal, and holds a detected signal for a certain period. Then, the method compares the held return light detection signal with an output command signal of a laser output control unit, and determines that the fiber is disconnected when the output command signal is present but the return light detection signal is not present.

Furthermore, an optical fiber monitor device disclosed in Japanese Unexamined Patent Publication (Kokai) No. 2006-292424 includes a laser oscillator that emits laser light at a specific frequency, a condensing optical system that condenses reflected light from an optical fiber on which the laser light is incident, and a photodetector that measures a light amount of the reflected light being incident from the condensing optical system.

Moreover, International Publication No. WO2010/041564 discloses a fiber fuse detector that detects a fiber fuse in an optical fiber through which laser light propagates. The fiber fuse detector includes a light input means that is disposed on a laser light incident side of the optical fiber and inputs at least a part of opposite direction propagation light propagating in a direction opposite to light incident on the optical fiber, a light receiving means for performing photoelectric conversion on the light input by the light input means, an electric filter means for extracting a predetermined frequency band component including a periodic signal due to the fiber fuse from an output signal of the light receiving means, a detection means for detecting a change of an output level of the electric filter means equal to or greater than a predetermined value, and a warning means for emitting a warning signal in response to a detected output of the detection means.

SUMMARY

All of the above-described techniques for detecting damage to an optical fiber detect damage to the optical fiber by passing laser light through the optical fiber. However, when the laser light is passed through the optical fiber after occurrence of an abnormality is detected, damage to the optical fiber may expand even through the occurrence of the abnormality is detected at a high speed and laser light output is stopped in order to prevent the damage from expanding. In some cases, a laser oscillator may also be damaged. It is also conceivable to detect damage by passing weak light through an optical fiber in order to prevent damage from expanding. However, in this case, a ratio of a measurement error to an absolute value of a light amount measured by a detector increases with the weak light. Thus, minor damage to the optical fiber cannot be accurately detected. As a result, it is falsely determined that there is no damage even though there is actually damage in the optical fiber. In such a case, when a laser device restarts laser light output, the damage to the optical fiber may expand at once.

In one aspect, an object is to provide a laser control device that can determine, when a laser device using an optical fiber for propagating laser light detects occurrence of an abnormality and stops laser light output, whether or not laser light is allowed to be re-output without passing light through the optical fiber.

According to one embodiment, a laser control device that controls a laser device including a laser oscillator that outputs laser light, an output light detector that detects a light amount of laser light output from the laser oscillator, a return light detector that detects a light amount of return light propagating in a direction opposite to a propagation direction of the laser light through a laser optical system including an optical fiber that propagates the laser light, and a control circuit that controls the laser oscillator is provided. The laser control device includes: a processor configured to determine, when the control circuit detects occurrence of an abnormality in the laser oscillator or the laser optical system and stops laser output from the laser oscillator, whether to enable or disable re-outputting of laser light from the laser oscillator by inputting input data being at least a part of state data indicating a state of the laser device and environmental data indicating a state of an environment in which the laser device and the optical fiber are installed in a predetermined period including a stop time of the laser output, to a classifier that determines whether to enable or disable re-outputting of laser light from the laser oscillator, based on the input data; and control the control circuit in accordance with the determination result. The state data and the input data in the predetermined period include at least one of time-series data about a light amount of the laser light and time-series data about a light amount of the return light in the predetermined period.

According to another embodiment, a laser control system including a laser device, and a laser control device that can communicate with the laser device via a communication network is provided. The laser device includes a laser oscillator that outputs laser light, an output light detector that detects a light amount of laser light output from the laser oscillator, a return light detector that detects a light amount of return light propagating in a direction opposite to a propagation direction of the laser light through a laser optical system including an optical fiber that propagates the laser light, a control circuit that controls the laser oscillator, and a memory configured to store, when the control circuit detects occurrence of an abnormality in the laser oscillator or the laser optical system and stops laser output from the laser oscillator, input data being at least a part of state data indicating a state of the laser device and environmental data indicating a state of an environment in which the laser device and the optical fiber are installed in a predetermined period including a stop time of the laser output. The control circuit transmits the input data stored in the memory to the laser control device, when communication between the laser device and the laser control device via the communication network is established. In addition, the laser control device includes a processor configured to determine whether to enable or disable re-outputting of laser light from the laser oscillator by inputting the input data to a classifier that determines whether to enable or disable re-outputting of laser light from the laser oscillator; and control the control circuit in accordance with the determination result. The state data and the input data in the predetermined period include at least one of time-series data about a light amount of the laser light and time-series data about a light amount of the return light in the predetermined period.

Further, according to another embodiment, a laser device is provided. The laser device includes: a laser oscillator that outputs laser light; an output light detector that detects a light amount of laser light output from the laser oscillator; a return light detector that detects a light amount of return light propagating in a direction opposite to a propagation direction of the laser light through a laser optical system including an optical fiber that propagates the laser light; and a control circuit that determines, when the control circuit detects occurrence of an abnormality in the laser oscillator or the laser optical system and stops laser output from the laser oscillator, whether to enable or disable re-outputting of laser light from the laser oscillator by inputting input data being at least a part of state data indicating a state of the laser device and environmental data indicating a state of an environment in which the laser device and the optical fiber are installed in a predetermined period including a stop time of the laser output, to a classifier that determines whether to enable or disable re-outputting of laser light from the laser oscillator, based on the input data, and that controls whether or not the laser oscillator re-outputs laser light in accordance with the determination result. The state data and the input data in the predetermined period include at least one of time-series data about a light amount of the laser light and time-series data about a light amount of the return light in the predetermined period.

According to still another embodiment, a laser control method of controlling a laser device including a laser oscillator that outputs laser light, an output light detector that detects a light amount of laser light output from the laser oscillator, a return light detector that detects a light amount of return light propagating in a direction opposite to a propagation direction of the laser light through a laser optical system including an optical fiber that propagates the laser light, and a control circuit that controls the laser oscillator is provided. The laser control method includes: determining, when the control circuit detects occurrence of an abnormality in the laser oscillator or the laser optical system and stops laser output from the laser oscillator, whether to enable or disable re-outputting of laser light from the laser oscillator by inputting input data being at least a part of state data indicating a state of the laser device and environmental data indicating a state of an environment in which the laser device and the optical fiber are installed in a predetermined period including a stop time of the laser output, to a classifier that determines whether to enable or disable re-outputting of laser light from the laser oscillator, based on the input data; and controlling the control circuit in accordance with the determination result. The state data and the input data in the predetermined period include at least one of time-series data about a light amount of the laser light and time-series data about a light amount of the return light in the predetermined period.

According to one aspect, when a laser device using an optical fiber for propagating laser light detects occurrence of an abnormality and stops laser light output, whether or not laser light is allowed to be re-output without passing light through the optical fiber can be determined.

BRIEF DESCRIPTION OF DRAWINGS

FIGS. 2A to 2C are each a flowchart illustrating one example of a learning process of a learning model and a laser light re-output enabling/disabling determination by using a learning model which has been trained according to the first embodiment of the present invention.

DESCRIPTION OF EMBODIMENTS

With reference to the drawings, a laser control device and a laser device controlled by such a laser control device will be described below. Note that the same component is denoted by the same reference sign in each of the drawings. Further, a scale is changed as appropriate in order to make the drawings easy to see.

The inventors of the present application have found that, when any sort of abnormality is detected in a laser device using an optical fiber for propagating laser light, data indicating an operation situation of the laser device in a predetermined period before and after the abnormality is detected, particularly, time-series data about a light amount of laser light output from the laser device (hereinafter, which may be referred to simply as laser output light) and time-series data about return light propagating in a direction opposite to a propagation direction of the laser light through the optical fiber (hereinafter, which may be referred to simply as return light) in the predetermined period before and after the abnormality is detected are closely related to presence or absence of damage to a laser optical system including a laser oscillator or the optical fiber. Thus, the laser control device determines whether to enable or disable re-outputting of laser light from the laser device by inputting, to a classifier has been trained in such a way as to determine whether or not laser light can be re-output, data indicating an operation situation of the laser device in a predetermined period before and after any sort of abnormality is detected in the laser device, particularly, time-series data about at least one of output light and return light in the predetermined period.

First, a laser control device according to a first embodiment will be described.

Figure 1:
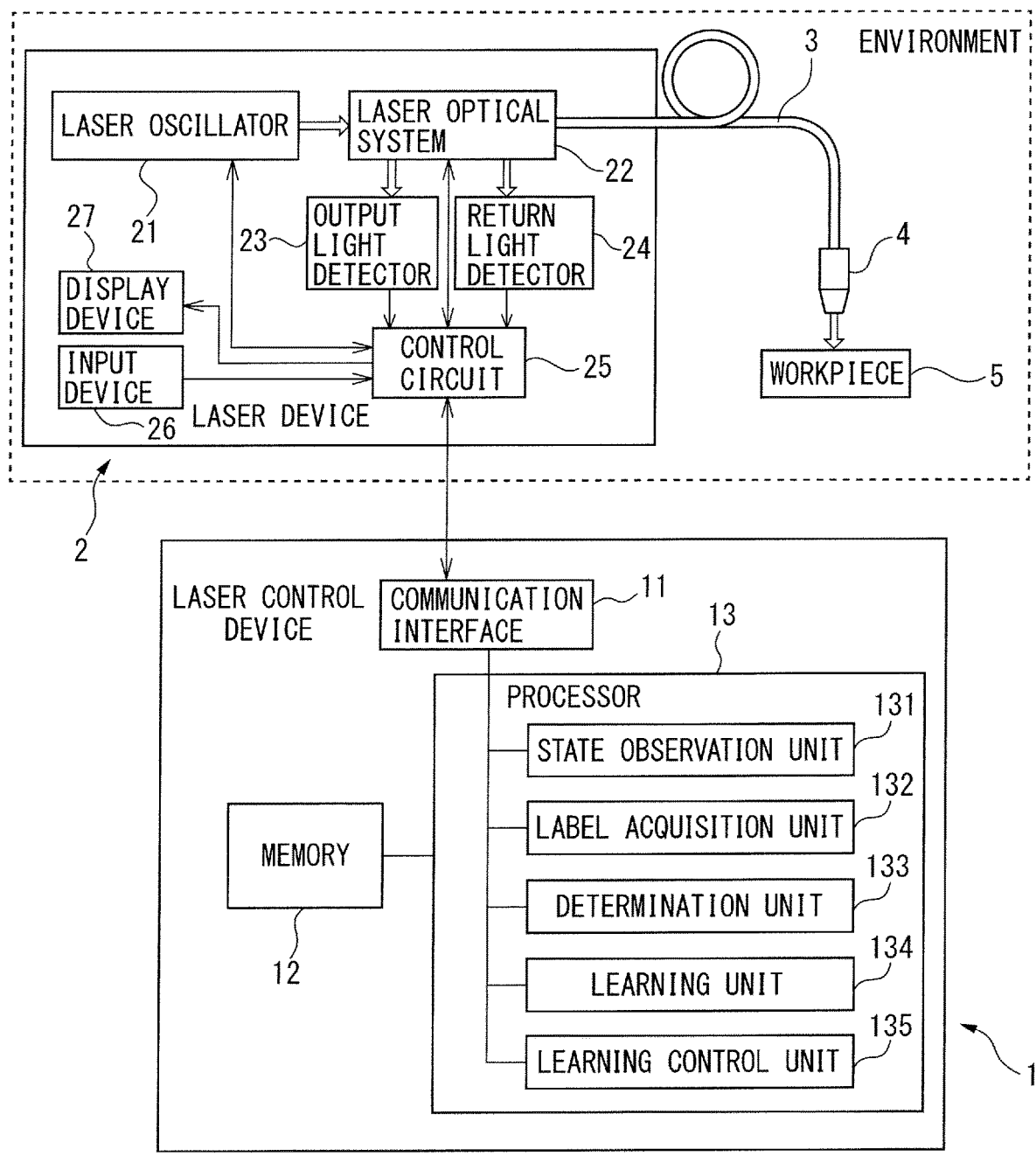
FIG. 1 is a schematic configuration diagram of a laser control device according to a first embodiment of the present invention and a laser device controlled by the laser control device.

FIG. 1 is a schematic configuration diagram of the laser control device according to the first embodiment of the present invention and a laser device controlled by the laser control device. Note that, in FIG. 1, an open arrow schematically indicates laser light propagating through the air or an optical fiber, and a solid arrow schematically indicates a signal and the like and a direction of the signal. Note that the matter is also similar in each of the drawings subsequent to FIG. 1 illustrating a schematic configuration.

A laser control device 1 according to the present embodiment controls a laser device 2. The laser device 2 includes at least a laser oscillator 21, a laser optical system 22, an output light detector 23, a return light detector 24, a control circuit 25, an input device 26, and a display device 27. Then, laser light output from the laser device 2 propagates through an optical fiber 3, is irradiated to a workpiece (processing object) 5 from a processing head 4, and is used for processing of the workpiece 5.

The laser oscillator 21 outputs laser light by performing laser oscillation in accordance with control from the control circuit 25. The laser oscillator 21 according to the present embodiment is not particularly limited. The laser oscillator 21 may be, for example, a laser oscillator of a solid-state laser form such as a fiber laser and a YAG laser, or a laser oscillator such as a direct diode laser.

The laser optical system 22 is provided between the laser oscillator 21 and the optical fiber 3, and condenses the laser light output from the laser oscillator 21 to one end surface of the optical fiber 3 in such a way that the laser light is incident on the optical fiber 3. Thus, the laser optical system 22 includes one or more lenses disposed along an optical axis that connects the laser oscillator 21 to the one end surface of the optical fiber 3. Note that, when the laser oscillator 21 and the optical fiber 3 are directly connected to each other, the laser optical system 22 may be omitted. Further, the optical fiber 3 itself may be regarded as a part of the laser optical system. Thus, hereinafter, the laser optical system 22 and the optical fiber 3 together may be referred to as a laser optical system.

The output light detector 23 detects a light amount of laser output light. For this purpose, the output light detector 23 includes one or more light receiving elements having sensitivity to the laser output light, such as a photodiode, for example. Then, the output light detector 23 is disposed in such a way as to receive the laser output light leaking from a fusion portion (not illustrated) of the optical fiber 3 or a portion acquired by removing a protective coating of the optical fiber 3 in the vicinity of the fusion portion, for example. Alternatively, the output light detector 23 may be disposed in the vicinity of the laser oscillator 21 side of the laser optical system 22 in such a way as to receive stray light generated by a part of the laser output light being reflected by a lens surface of the laser optical system 22. Alternatively, the output light detector 23 may be disposed in such a way as to receive a part of the laser output light divided by a beam splitter (not illustrated) disposed between the laser oscillator 21 and the laser optical system 22. Alternatively, the output light detector 23 may be disposed in the vicinity of the processing head 4 of the optical fiber 3 in such a way as to receive a part of the laser output light or stray light generated by the laser output light. Then, the output light detector 23 outputs a measurement value of the light amount of the laser output light to the control circuit 25.

The return light detector 24 detects a light amount of return light that propagates through the optical fiber 3 in a direction opposite to a propagation direction of the laser output light and is emitted from the one end surface of the optical fiber 3 toward the laser oscillator 21 side. For this purpose, the return light detector 24 includes one or more light receiving elements having sensitivity to the return light, such as a photodiode, for example. Then, the return light detector 24 is disposed in such a way as to receive the return light leaking from the fusion portion of the optical fiber 3 or the portion acquired by removing the protective coating of the optical fiber 3 in the vicinity of the fusion portion, for example, similarly to the output light detector 23. Alternatively, the return light detector 24 may be disposed in such a way as to receive the return light transmitted through a high-reflecting mirror (not illustrated: a high-reflecting fiber Bragg grating (HRFBG) in a case of a fiber laser) constituting the laser oscillator 21. Alternatively, the return light detector 24 may be disposed in the vicinity of the optical fiber 3 side of the laser optical system 22 in such a way as to receive stray light generated by a part of the return light being reflected by a lens surface of the laser optical system 22. Alternatively, the return light detector 24 may be disposed in such a way as to receive a part of the return light divided by the beam splitter (not illustrated) disposed between the laser optical system 22 and the optical fiber 3. Then, the return light detector 24 outputs a measurement value of the light amount of the return light to the control circuit 25.

The control circuit 25 outputs a light output command for causing the laser oscillator 21 to output laser light or an output stop command for causing the laser oscillator 21 to stop outputting laser light, in accordance with a control signal from the laser control device 1, a measurement value of a light amount of laser output light, a measurement value of a light amount of return light, or an operation signal from the input device 26. Note that the expression of "the control circuit 25 outputs a light output command to the laser oscillator 21" simply represents the meaning of "a power output command is output to a power supply (not illustrated) constituted in such a way as to supply drive power to the laser oscillator 21". The same also applies to each embodiment or a modification example in the following.

The control circuit 25 includes, for example, an arithmetic circuit such as a central processing unit (CPU), a memory circuit, a drive circuit that drives a power supply (not illustrated) for supplying drive power to the laser oscillator 21, a communication circuit for communicating with each unit of the laser device 2 and the laser control device 1, and the like. Note that the control circuit 25 may be constituted of a field programmable gate array. When the control circuit 25 receives an operation signal for activating the laser device 2 from the input device 26, for example, the control circuit 25 outputs the light output command to the laser oscillator 21. Further, when the control circuit 25 receives an operation signal for stopping the laser device 2 from the input device 26, the control circuit 25 outputs the output stop command to the laser oscillator 21. Furthermore, when a measurement value of a light amount of laser output light or a measurement value of a light amount of return light falls outside a predetermined allowable range, the control circuit 25 determines that some sort of abnormality occurs in the laser device 2 or the optical fiber 3. For example, when a measurement value of a light amount of laser output light is smaller than a predetermined lower limit threshold value or when a measurement value of a light amount of return light is greater than a predetermined upper limit threshold value, the control circuit 25 determines that some sort of abnormality occurs in the laser device 2 or the optical fiber 3. Note that the predetermined lower limit threshold value may be set as a function of the light output command. Further, the expression of "an abnormality occurs" does not mean that irreversible damage to the laser device occurs, and is used to mean that the laser device is in an abnormal state. When the control circuit 25 detects occurrence of an abnormality, the control circuit 25 outputs the output stop command to the laser oscillator 21, and also notifies the laser control device 1 that the occurrence of the abnormality is detected. Furthermore, while training of a learning model is executed, the control circuit 25 may re-output the light output command to the laser oscillator 21 after the control circuit 25 detects the occurrence of the abnormality. Then, when the occurrence of the abnormality is not detected even after a certain period has elapsed since the light output command is re-output, the control circuit 25 outputs a light output enabling label indicating that the occurrence of the abnormality is not detected to the laser control device 1. On the other hand, when the occurrence of the abnormality is detected again within the certain period since the light output command is re-output, the control circuit 25 outputs a light output disabling label indicating that the occurrence of the abnormality is detected again to the laser control device 1.

Furthermore, the control circuit 25 continuously outputs data (hereinafter referred to as state data) indicating a state of each unit of the laser device 2 to the laser control device 1. Note that the state data include, for example, a measurement value of a light amount of laser output light, a measurement value of a light amount of return light, control data of the control circuit 25 including a value that designates a drive current amount supplied to the laser oscillator 21, and a measurement value by another sensor (for example, an ammeter, a voltmeter, or a thermometer) installed in the laser device 2.

Further, when learning of the learning model is completed, the control circuit 25 outputs a signal for inquiring about whether to enable or disable a restart of the laser light output and the like to the laser control device 1, after the control circuit 25 detects the occurrence of the abnormality and causes the laser oscillator 21 to temporarily stop the laser light output. Then, when the control circuit 25 receives a control signal indicating allowance for the restart of the laser light output from the laser control device 1, the control circuit 25 outputs the light output command to the laser oscillator 21. On the other hand, when the control circuit 25 receives a control signal indicating disallowance for the restart of the laser light output from the laser control device 1, the control circuit 25 maintains the state while stopping the laser light output by the laser oscillator 21.

The input device 26 includes, for example, a plurality of operation buttons. Then, the input device 26 generates an operation signal (for example, an operation signal for activating the laser device 2, an operation signal for stopping laser light output by the laser device 2, an operation signal for setting output intensity of laser light, and the like) in response to an operation button operated by a user among the plurality of operation buttons, and outputs the generated operation signal to the control circuit 25.

The display device 27 is, for example, a liquid crystal display, and displays various display data received from the control circuit 25, for example, data indicating a state of the laser device 2. Note that the input device 26 and the display device 27 may be integrally constituted like a touch panel display. Further, the input device 26 and the display device 27 may be provided in the laser control device 1.

The laser control device 1 includes a communication interface 11, a memory 12, and a processor 13.

The communication interface 11 is one example of a communication unit, and includes a communication circuit for communicating with the laser device 2 and the like. Then, the communication interface 11 passes various data or various signals received from the laser device 2 to the processor 13. Further, the communication interface 11 outputs, to the laser device 2, a control signal for the laser device 2 received from the processor 13. Furthermore, the communication interface 11 may be communicably connected to one or more sensors (for example, a thermometer or a hygrometer installed in the vicinity of the processing head 4 or the workpiece 5) that measure data (hereinafter referred to as environmental data) indicating a state of an environment around the laser device 2 and the optical fiber 3, and may pass the environmental data received from the sensor to the processor 13. Note that the communication interface 11 may receive the environmental data via the control circuit 25 of the laser device 2. The environmental data include, for example, a temperature or humidity in the vicinity of the processing head 4 or the workpiece 5, and internal data of a drive device (not illustrated) that controls a relative positional relationship between the processing head 4 and the workpiece 5.

The memory 12 is one example of a storage unit, and stores various data used for controlling the laser device 2 by the laser control device 1 and a program operating on the processor 13. For example, the memory 12 stores a group of parameters represents a learning model used for determining whether to enable or disable a restart of laser light output after an abnormality is detected in the laser device 2 and the laser light output is temporarily stopped, the environmental data and the state data about the laser device 2 used for learning of such a learning model. For this purpose, the memory 12 includes, for example, a nonvolatile read-only semiconductor memory and a volatile readable and writeable semiconductor memory. Furthermore, the memory 12 may include a ring buffer. Furthermore, the memory 12 may include a magnetic recording medium or an optical recording medium, and a storage device such as an access device of the magnetic recording medium or the optical recording medium.

The processor 13 is one example of a control unit, and includes, for example, a central processing unit (CPU) and a peripheral circuit of the CPU. Furthermore, the processor 13 may include a processor for a logical operation and a processor for a numerical operation. Furthermore, the processor 13 may include an arithmetic circuit constituted of a field programmable gate array. Then, the processor 13 executes processing related to control of the laser device 2. For this purpose, the processor 13 includes a state observation unit 131, a label acquisition unit 132, a determination unit 133, a learning unit 134, and a learning control unit 135. Each of the units of the processor 13 is for example, a functional module achieved by a computer program executed on the processor 13. Alternatively, each of the units may be mounted as a dedicated arithmetic circuit mounted on a part of the processor 13. Further, the processor 13 may not need to be constituted of one processor, and a separate dedicated processor for executing processing of the learning unit 134 having a great calculation load in particular and the like may be provided.

The state observation unit 131 observes the state data and the environmental data. In the present embodiment, the state observation unit 131 continuously acquires the state data and the environmental data via the communication interface 11, and stores the acquired state data and the acquired environmental data in the memory 12. At this time, the state observation unit 131 may write the state data and the environmental data to the ring buffer included in the memory 12. In this case, the state data and the environmental data in the latest certain period are stored in the ring buffer.

The label acquisition unit 132 acquires, as a label such as the light output enabling label or the light output disabling label, enabling/disabling of re-outputting of the light output command from the control circuit 25 of the laser device 2, after the control circuit 25 detects occurrence of an abnormality and outputs the output stop command. For example, the label acquisition unit 132 can acquire, from the control circuit 25 via the communication interface 11, the light output enabling label indicating that occurrence of an abnormality is not detected again even when the light output command is re-output after occurrence of an abnormality is detected, and the light output disabling label indicating that occurrence of an abnormality is detected again when the light output command is output after occurrence of an abnormality is detected and light output is immediately stopped again. No human is preferably involved in the acquisition of the labels. However, when damage that disables re-outputting of the light output command after occurrence of an abnormality is detected is found as a result of disassembling and investigating the laser device 2, and the like, a human may operate the input device 26 and cause the control circuit 25 to output the light output disabling label.

The determination unit 133 inputs, when the control circuit 25 of the laser device 2 detects occurrence of an abnormality, and then outputs the output stop command to the laser oscillator 21, to a learning model for determining whether to enable or disable a restart of laser light output, input data being at least a part of the state data and the environmental data within a predetermined period including an output stop time when the control circuit 25 outputs the output stop command (i.e., the time when the laser light output is stopped). In this way, the determination unit 133 determines whether to enable or disable the restart of the laser light output. Further, the determination unit 133 controls the control circuit 25 of the laser device 2 in regard to whether to enable or disable the restart of the laser light output in accordance with the determination result. Note that the learning model is one example of a classifier.

The predetermined period can be set as a period from the time going back a first predetermined period from the output stop time until the time after a lapse of a second predetermined period since the output stop time. A problem in that an amount of data becomes too great or effective data are buried in ineffective data arises when the first predetermined period is set to be long. Thus, the first predetermined period is preferably set to be greater than zero and typically to an order of about 10 ms. Further, there is a similar problem with respect to the second predetermined period, and a large amount of effective data are present before the output stop time. Thus, the second predetermined period is preferably set to be the same as or shorter than the first predetermined period. Further, the second predetermined period may be set to zero. In other words, the output stop time may be set at a terminal of the predetermined period.

In the present embodiment, the learning model can be, for example, a multilayer perceptron-type neural network or a support vector machine. Note that the input data to be input to the learning model preferably include at least one of time-series data about a measurement value of a light amount of laser output light and time-series data about a measurement value of a light amount of return light in the predetermined period in particular, and more preferably include both of the time-series data about a measurement value of a light amount of laser output light and the time-series data about a measurement value of a light amount of return light in the predetermined period. The time-series data about a measurement value of a light amount of laser output light and the time-series data about a measurement value of a light amount of return light in the predetermined period are highly relevant to an abnormality occurring in any of the laser oscillator 21 and the optical fiber 3. Thus, the learning model can accurately determine whether to enable or disable a restart of laser light output by setting the pieces of time-series data as the input data of the learning model. As a result, when any of the laser oscillator 21 and the optical fiber 3 has an abnormality in which a restart of laser light output expands damage, the restart of the laser light output is suppressed.

Note that, among the state data, control data by the control circuit 25 such as a target value of a drive current supplied to the laser oscillator 21 may be used as one piece of the input data. Such control data do not change in a short time, and thus a value at any time during the predetermined period may be used as the input data. Further, among the state data or the environmental data, data measured by a sensor such as an ammeter, a voltmeter, or a photodetector may be used as another piece of the input data. Such measurement data may change before and after occurrence of an abnormality, and thus time-series measurement data during the predetermined period are preferably used as the input data.

The learning unit 134 trains a learning model. In the present embodiment, the learning unit 134 trains a learning model in accordance with a predetermined supervised learning technique, such as a back propagation method, by using a plurality of pieces of teacher data each including a pair of the input data among the state data and the environmental data in the predetermined period when the control circuit 25 of the laser device 2 detects occurrence of an abnormality and a label corresponding to the input data.

The learning control unit 135 controls a learning process of the learning model by the learning unit 134. For this purpose, the learning control unit 135 executes processing of generating teacher data by associating the state data and the like acquired by the state observation unit 131 with the label acquired by the label acquisition unit 132, writing the teacher data to the memory 12, reading the teacher data from the memory 12, passing the teacher data to the learning unit 134, and the like. For example, when the learning control unit 135 is notified that occurrence of an abnormality is detected from the control circuit 25, the learning control unit 135 reads the state data and the like in the predetermined period described above from the memory 12, associates the state data with the label acquired by the label acquisition unit 132, and separately stores the state data associated with the label as teacher data in the memory 12. Furthermore, the learning control unit 135 determines whether or not learning of the learning model by the learning unit 134 has been completed, and, when the learning of the learning model has been completed, the learning control unit 135 notifies the control circuit 25 of the laser device 2 that the learning is completed via the communication interface 11.

Figure 2A:
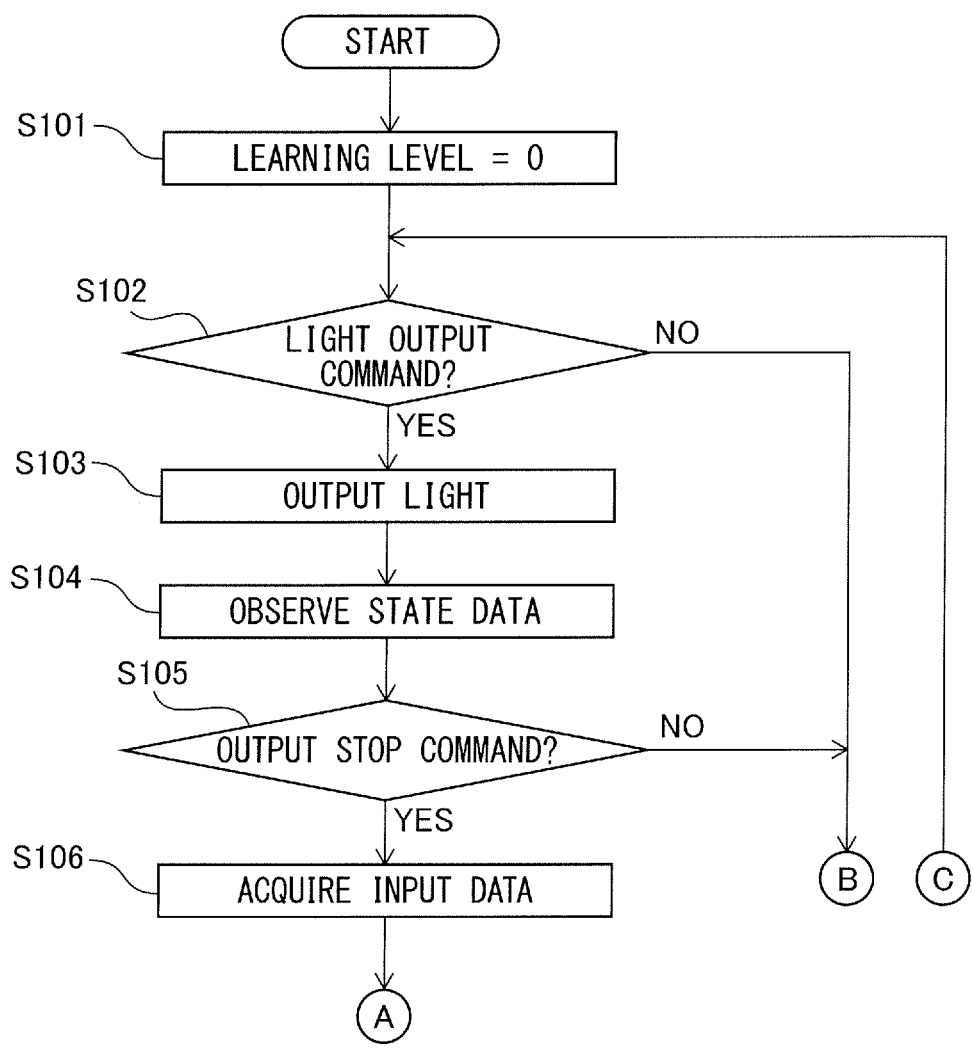
Figure 2B:
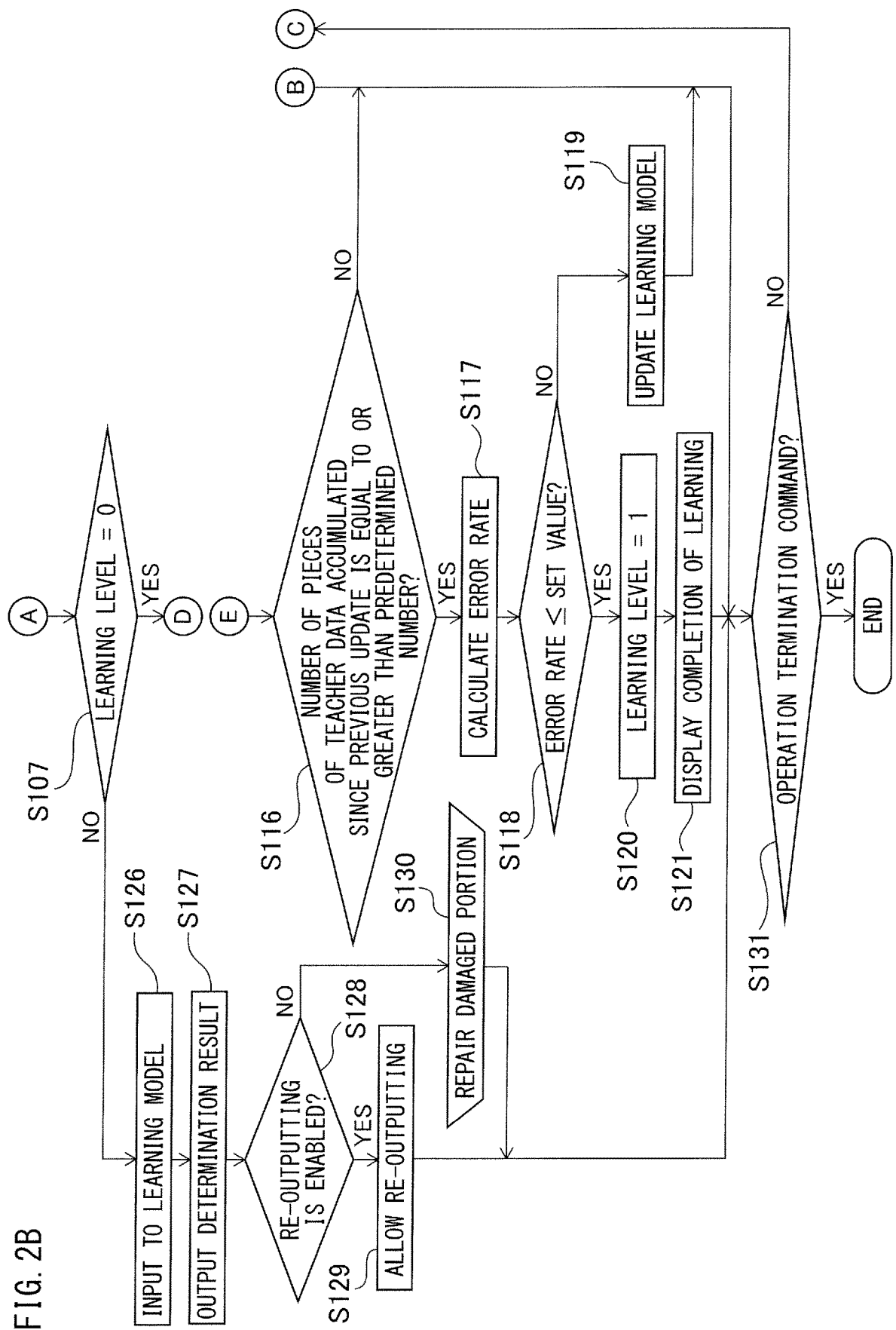

FIGS. 2A to 2C are each a flowchart illustrating one example of a learning process of a learning model and a laser light re-output enabling/disabling determination by using a learned learning model according to the first embodiment.

When the laser control device 1 starts operating, first, zero is set to a learning level being an internal variable of the learning control unit 135, in order to make it clear that a learning attainment level of the learning model has not yet, reached a set level (step S101). Next, the learning control unit 135 determines whether or not the control circuit 25 of the laser device 2 is requested to output a light output command (step S102). When the control circuit 25 is requested to output the light output command (step S102-Yes), the learning control unit 135 outputs, to the control circuit 25 via the communication interface 11, a control signal for allowing outputting of laser light in accordance with the light output command. Then, the control circuit 25 outputs the light output command to the laser oscillator 21, and thus the laser light is output from the laser oscillator 21 (step S103).

The state observation unit 131 always acquires, from the control circuit 25, environmental data and state data about the laser device 2 including a measurement value of a light amount of laser output light and a measurement value of a light amount of return light, and also always observes whether or not the control circuit 25 detects occurrence of an abnormality and outputs an output stop command. When the occurrence of the abnormality is detected, the state observation unit 131 acquires a signal indicating the detection of the occurrence of the abnormality from the control circuit 25 via the communication interface 11 (step S104).

The learning control unit 135 determines, via the state observation unit. 131, whether or not the control circuit 25 detects the occurrence of the abnormality, i.e., whether or not the output stop command is output (step S105). When the output stop command is output (step S105-Yes), the learning control unit 135 reads, as input data, at least any of the state data and the environmental data in the predetermined period described above from the memory 12 (for example, a ring buffer) (step S106). Next, the learning control unit 135 determines whether or not the learning level being the internal variable of the learning control unit 135 is zero in order to check the learning level (step S107). When the learning level is zero (step S107-Yes), the learning model is in the process of training, and the learning control unit 135 determines whether or not a set learning mode is an automatic re-output mode (step S108).

Herein, the automatic re-output mode is a learning mode in which the learning control unit 135 automatically orders the control circuit 25 to re-output the light output command after, for example, the processing head 4 is retracted to a position where reflected light from the workpiece 5 is not generated when the control circuit 25 detects occurrence of an abnormality and outputs the light output stop command, and laser light output is then stopped. There is an advantage of advancing learning without a human being involved, but a situation may occur where damage to the optical fiber 3 or the laser optical system 22 expands, and, in some cases, damage expands to the laser oscillator 21, and therefore the laser device 2 needs repair. However, even when the control circuit 25 detects occurrence of an abnormality and outputs the light output stop command, there are many cases in which reflected light from the workpiece 5 exceeds a reference temporarily. In such a case, the laser light output is instantaneously stopped by the light output stop command, and thus the optical fiber 3 and the like are not damaged in any way. For this reason, even in some cases in which damage expands and repair is needed as described above, whether to enable or disable re-outputting of the light output command from the control circuit 25 is automatically determined when the laser device 2 stops the laser light output due to the output stop command from the control circuit 25. Thus, the automatic re-output mode may be adopted when the cost is conceivably needed for developing a user-friendly and highly reliable laser device.

When it is determined that the automatic re-output mode is set in step S108 (step S108-Yes), the learning control unit 135 orders, via the communication interface 11, the control circuit 25 to re-output the light output command to the laser oscillator 21, and the laser light is re-output (step S109). As a result of the re-outputting of the laser light, the learning control unit 135 determines whether or not the output stop command is re-output from the control circuit 25 via the state observation unit 131 (step S110). When it is determined that the output stop command is re-output from the control circuit 25 (step S110-Yes), it is expected that there is a damaged portion in the laser device 2 or the optical fiber 3, and the laser device 2 or the optical fiber 3 is in a state of needing repair. Thus, the learning control unit 135 orders, via the communication interface 11, the control circuit 25 to display that the laser device 2 or the optical fiber 3 is in a repair requiring state on the display device 27 and the like (step S112). In this case, a human repairs the damaged portion (step S113), and this means that the laser light output should not be performed again. Thus, the label acquisition unit 132 acquires, as a light output disabling label, a fact that the output stop command was re-output from the control circuit 25 (step S114). Then, the learning control unit 135 associates the input data acquired in step S106 with the light output disabling label, and thus a pair of the input data and the light output disabling label serving as one piece of teacher data is formed (step S115).

Further, when it is determined that the output stop command is not re-output from the control circuit 25 even after a lapse of a certain period in step S110 (step S110-No), it is estimated that the laser device 2 or the optical fiber 3 is not damaged, so as to avoid a problem from occurring. Accordingly, the laser light can be re-output, and thus the label acquisition unit 132 acquires, as a light output enabling label, a fact that the output stop command was not re-output from the control circuit 25 (step S111). Then, in step S115, the learning control unit 135 associates the input data acquired in step S106 with the light output enabling label, and thus a pair of the input data and the light output enabling label serving as one piece of teacher data is formed.

After step S115, the learning control unit 135 determines whether or not the number of pieces of teacher data accumulated since a previous update of the learning model has reached a predetermined number (1000, for example) (step S116). When the number of pieces of teacher data has not reached the predetermined number (step S116-No), the learning control unit 135 determines whether or not an operation termination command is output to the laser control device 1 (step S131). When the operation termination command is output (step S131-Yes), the laser control device 1 terminates the operation. On the other hand, when the operation termination command is not output (step S131-No), the learning control unit 135 repeats the processing in and after step S102.

On the other hand, when the number of the pieces of teacher data has reached the predetermined number (step S116-Yes), the learning control unit 135 determines whether or not a determination result by the learning model is correct by comparing a determination result acquired by inputting input data included in each of the pieces of teacher data accumulated since the previous update of the learning model with a label included in the teacher data. Then, the learning control unit 135 acquires an error rate of the determination result by the learning model from the determination result of each of the pieces of teacher data (step S117). Note that the learning control unit 135 may execute a determination on real-time input data while learning by online learning instead of the batch learning as described above.

The learning control unit 135 determines whether or not the error rate is equal to or less than a predetermined set value (step S118). When the error rate is greater than the predetermined set value (step S118-No), learning of the learning model is not sufficient, and thus accuracy of determining whether to enable or disable re-outputting of the laser light is insufficient. Thus, the learning control unit 135 updates the learning model by causing the learning unit 134 to learn the learning model by using all teacher data stored in the memory 12 (step S119). Subsequently, when the operation termination command is not output in step S131, the learning control unit 135 repeats the processing in and after step S102.

On the other hand, when the error rate is equal to or less than the predetermined set value (step S118-Yes), learning of the learning model is sufficient. As a result, sufficient accuracy of determining whether to enable or disable re-outputting of the laser light is acquired. Thus, the learning control unit 135 sets the learning level to "1" indicating that the learning is completed (step S120). Furthermore, the learning control unit 135 notifies, via the communication interface 11, the control circuit 25 that the learning of the learning model is completed, and also causes the display device 27 to display that the learning of the learning model is completed (step S121).

After step S121, when outputting of the light output command is not requested in step S102 (step S102-No) or when it is determined that the output stop command is not output from the control circuit 25 in step S105 (step S105-No), the learning control unit 135 also determines whether or not the operation termination command is output to the laser control device 1 (step S131). When the operation termination command is output (step S131-Yes), the laser control device 1 terminates the operation. On the other hand, when the operation termination command is not output (step S131-No), the learning control unit 135 repeats the processing in and after step S102. Note that, when the light output command is not output to the laser device 2 in step S102 and the operation termination command is not output in step S131, the learning control unit 135 waits until any of the light output command and the operation termination command is output.

Note that a time cycle until the processing in step S104 is executed again after the processing is executed in order of step S104, step S105, step S131, step S102, and step S103 is preferably an order of 10 μs or less.

Further, when it is determined that the learning mode is not set to the automatic re-output mode in step S108 (step S108-No), the display device 27 displays that the laser device 2 is in a stop state because the output stop command is output from the control circuit 25 (Step S122). Note that the control circuit 25 may simultaneously sound a buzzer (not illustrated) and the like in order to make a human (person in charge) aware early of the stop state of the laser device 2. In this case, after the laser device 2 is in the stop state, a human (person in charge) disassembles and investigates a portion of the laser device 2 or the optical fiber 3 suspected of damage, and checks presence or absence of the damaged portion, or a state of the laser device 2 or the optical fiber 3. Then, the investigation result is input via the input device 26 (step S123). The learning control unit 135 receives the input investigation result from the control circuit 25, and determines whether to enable or disable re-outputting of the laser light by referring to the investigation result (step S124). When it is determined that the re-outputting of the laser light is enabled (step S124-Yes), the learning control unit 135 executes the processing in and after step S109 described above.

On the other hand, when the learning control unit 135 determines that the re-outputting of the laser light is disabled in step S124 (step S124-No), the damaged portion needs repair. Thus, a human repairs the damaged portion of the laser device 2 or the optical fiber 3 (step S125), and the learning control unit 135 may execute the processing in and after step S114 described above.

When the learning level is set to "1" in step S120 described above, the learning of the learning model is completed. Thus, by using the learning model being a learning result, when occurrence of an abnormality is newly detected, the determination unit 133 can appropriately determine whether to enable or disable re-outputting of laser light for input data at the time of the detection, i.e., whether or not the light output command is re-output from the control circuit 25 to the laser oscillator 21. In other words, when it is determined that the learning level is "1" in step S107 (step S107-No), the determination unit 133 inputs the input data acquired in step S106 to the learning model (step S126). Then, the determination unit 133 acquires a determination result of whether to enable or not the re-outputting of the laser light from the learning model (step S127). The determination unit 133 determines whether to enable or not the determination result indicates that the re-outputting of the laser light (step S128). When the re-outputting of the laser light is enabled (step S128-Yes), the determination unit 133 outputs, to the control circuit 25 via the communication interface 11, a control signal for giving allowance for the re-outputting in response to the inquiry about whether to enable or disable the re-outputting of the laser light from the control circuit 25 (step S129).

On the other hand, when the re-outputting of the laser light is disabled (step S128-No), the determination unit 133 outputs, to the control circuit 25 via the communication interface 11, a control signal for giving disallowance for the re-outputting in response to the inquiry about whether to enable or disable the re-outputting of the laser light from the control circuit 25, and also causes the display device 27 to display that a failure is detected. Then, repair is performed on the damaged portion of the laser device 2 or the optical, fiber 3 (step S130).

After step S129 or step S130, the determination unit 133 may execute the processing in step S131.

As described above, when occurrence of an abnormality of the laser device or the optical fiber is detected, there are cases in which the light output command may be re-output, such as a case in which a cause of the abnormality is temporal false detection due to noise or a case of a normal damage avoiding operation to a state in which return light by laser output light reflected by a workpiece surface exceeds a predetermined level. On the other hand, there are cases in which the light output command may not be output when the abnormality is caused by damage occurring or being about to occur in the laser oscillator, the optical fiber, or the like for some reasons, and a damaged portion expands by re-outputting the light output command. However, the laser control device according to the present embodiment can immediately and appropriately determine whether or not the light output command may be re-output by inputting, to a learning model, input data selected from among state data and environmental data in a predetermined period including a time at which occurrence of an abnormality is detected and laser light output is stopped, without causing light to be incident on the optical fiber and the like again after the occurrence of the abnormality is detected and the laser light output is stopped. Thus, the laser control device can reduce unnecessary man-hours, and can also prevent expansion of damage occurring in the laser oscillator, the optical fiber, or the like due to a false determination of whether to enable or disable re-outputting of the light output command.

Next, a second embodiment will be described. A laser control device according to the second embodiment can easily acquire teacher data when an optical fiber breakage device of the laser control device damages an optical fiber, i.e., when an additional light output command is rejected.

Figure 3:
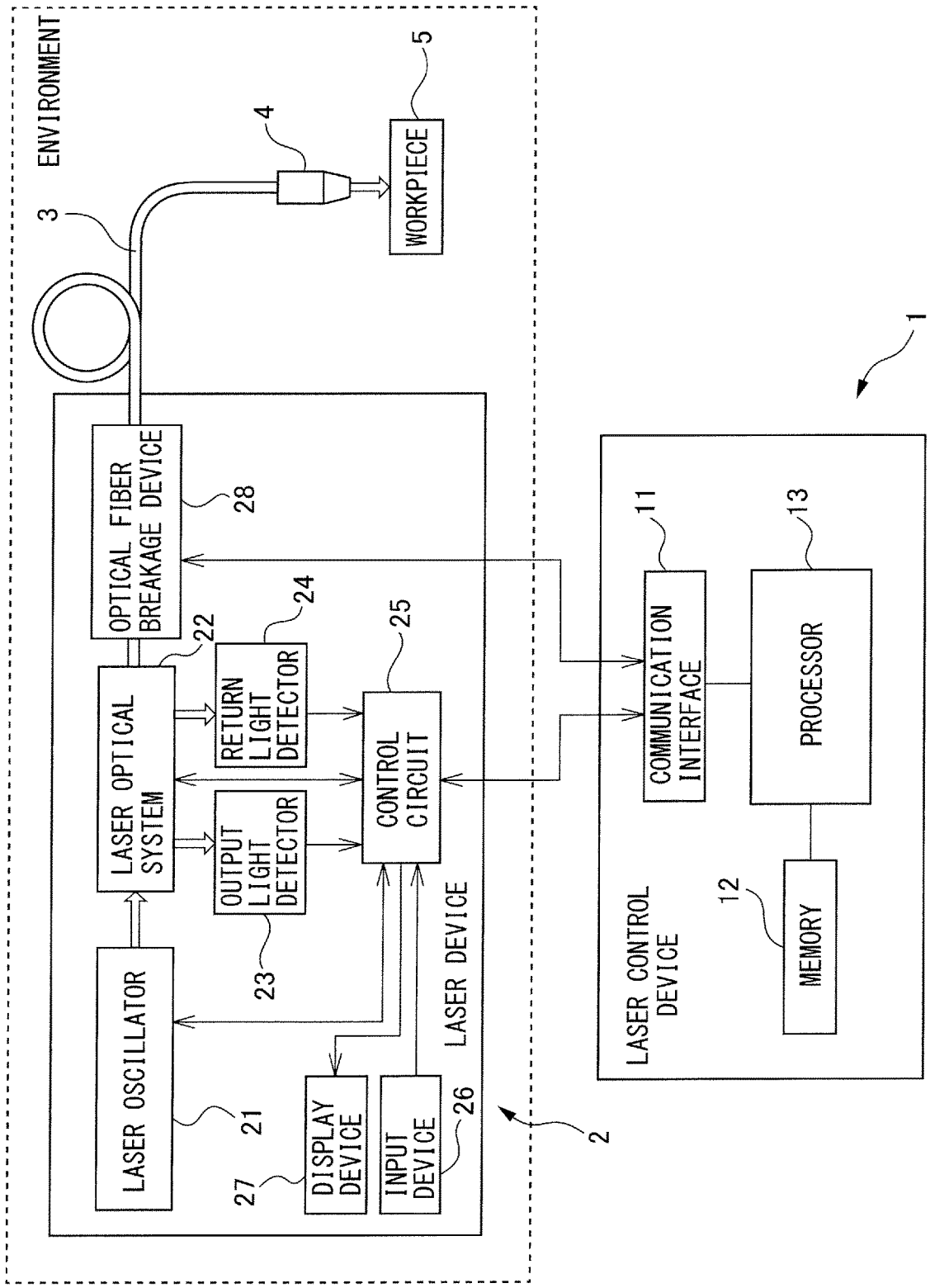
FIG. 3 is a schematic configuration diagram of a laser control device according to a second embodiment of the present invention and a laser device controlled by the laser control device.

FIG. 3 is a schematic configuration diagram of the laser control device and a laser device controlled by the laser control device according to the second embodiment of the present invention. A difference between the second embodiment and the first embodiment illustrated in FIG. 1 is that a laser control device 1 further includes an optical fiber breakage device 28.

In the present embodiment, although the optical fiber breakage device 28 is a part of a configuration of the laser control device 1, the optical fiber breakage device 28 is installed in the laser device 2, and breaks an optical fiber 3 by a command from a learning control unit 135. Note that the optical fiber breakage device 28 may be installed in such a way as to break a portion of the optical fiber 3 located outside a laser device 2. The optical fiber breakage device 28 is configured in such a way as to be able to break the optical fiber 3 in at least one or more places of the optical fiber 3 and in a specific section in principle, while the laser device 2 outputs laser light. For example, the specific section is preferably a section in which the laser device 2 can be functionally restored by fusing the broken optical fiber 3 again. When the optical fiber 3 is broken by the command from the learning control unit 135, the optical fiber breakage device 28 may output a breakage occurrence signal to a label acquisition unit. 132 of a processor 13 via a communication interface 11, and the label acquisition unit 132 may acquire at least the breakage occurrence signal as a light output disabling label.

Figure 4:
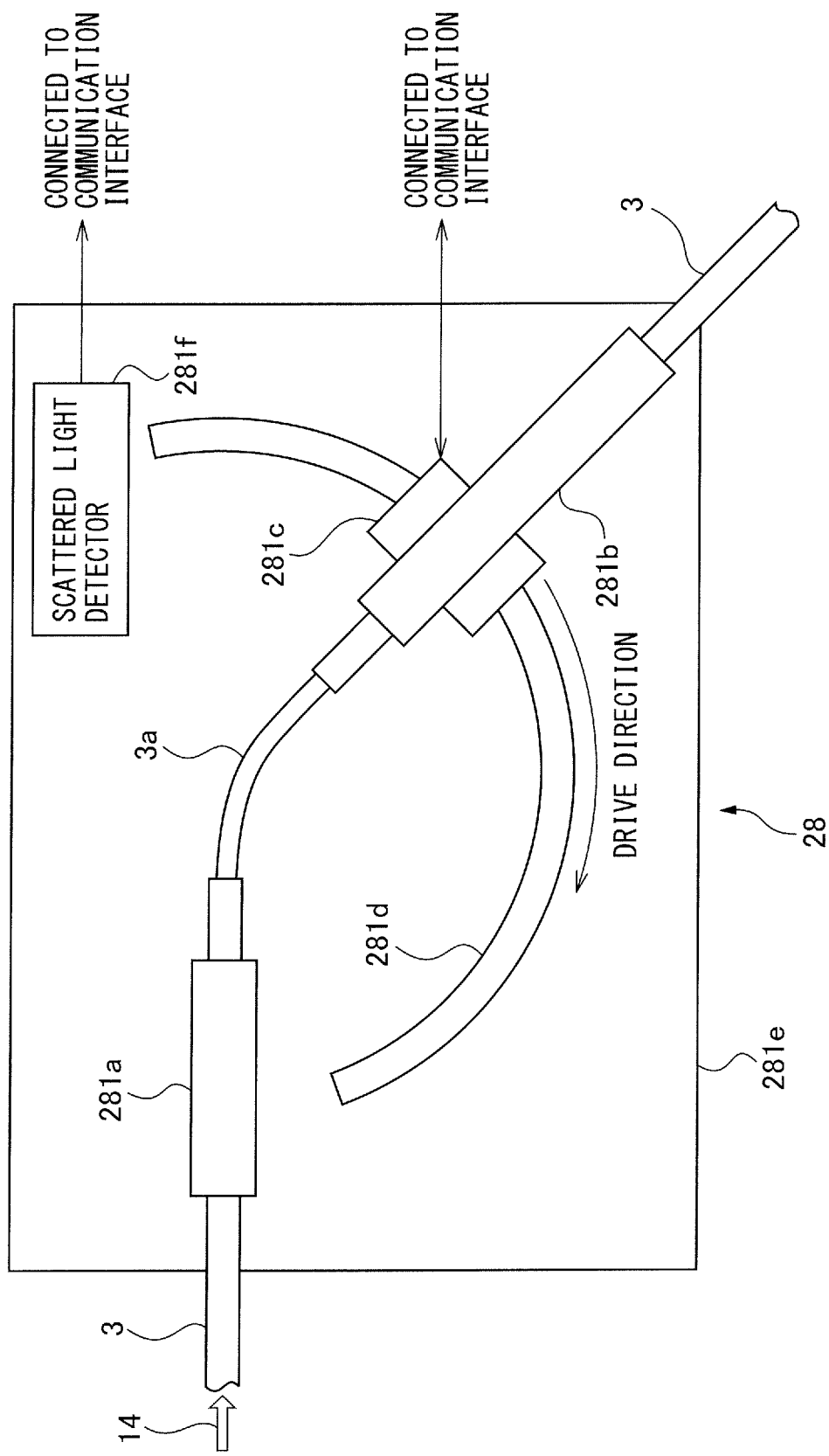
FIG. 4 is a diagram illustrating one example of a configuration of an optical fiber breakage device.

FIG. 4 is a diagram illustrating one example of a configuration of the optical fiber breakage device 28. In this example, as illustrated in FIG. 4, the optical fiber breakage device 28 has a configuration in such a way as to gradually bend the optical fiber 3, and literally break the optical fiber 3 when a curvature of a bent portion 3a exceeds a limit. In such a way as to gradually increase a curvature of the portion (bent portion) 3a acquired by removing the protective coating of the optical fiber 3, the optical fiber breakage device 28 holds one end side of the portion 3a acquired by removing a protective coating of the optical fiber 3 with an optical fiber fixing holder 281a that fixedly holds the optical fiber 3, and holds the other end side of the portion 3a with an optical fiber movement holder 281b. Then, the optical fiber breakage device 28 moves the optical fiber movement holder 281b in a drive direction illustrated in the drawing along an arc drive guide rail 281d by an arc drive device 281c including a motor and a wheel driven by the motor, for example. A clad outer surface outside the bent portion 3a may be previously slightly scratched in order to uniquely determine a place where a breakage occurs or easily cause a breakage. Each unit of the optical fiber breakage device 28 is housed in a light-shielding housing 281e. In this way, laser light can be prevented from leaking to the outside when the optical fiber 3 is broken. Further, a scattered light detector 281f such as a photodiode may be disposed in the light-shielding housing 281e. Then, the optical fiber breakage device 28 may use, as a breakage occurrence signal, scattered light in the light-shielding housing 281e generated when the optical fiber 3 is broken, by detecting the scattered light by the scattered light detector 281f. For this purpose, signal lines of the arc drive device 281c and the scattered light detector 281f may be connected to the communication interface 11 of the laser control device 1.

Figure 5:
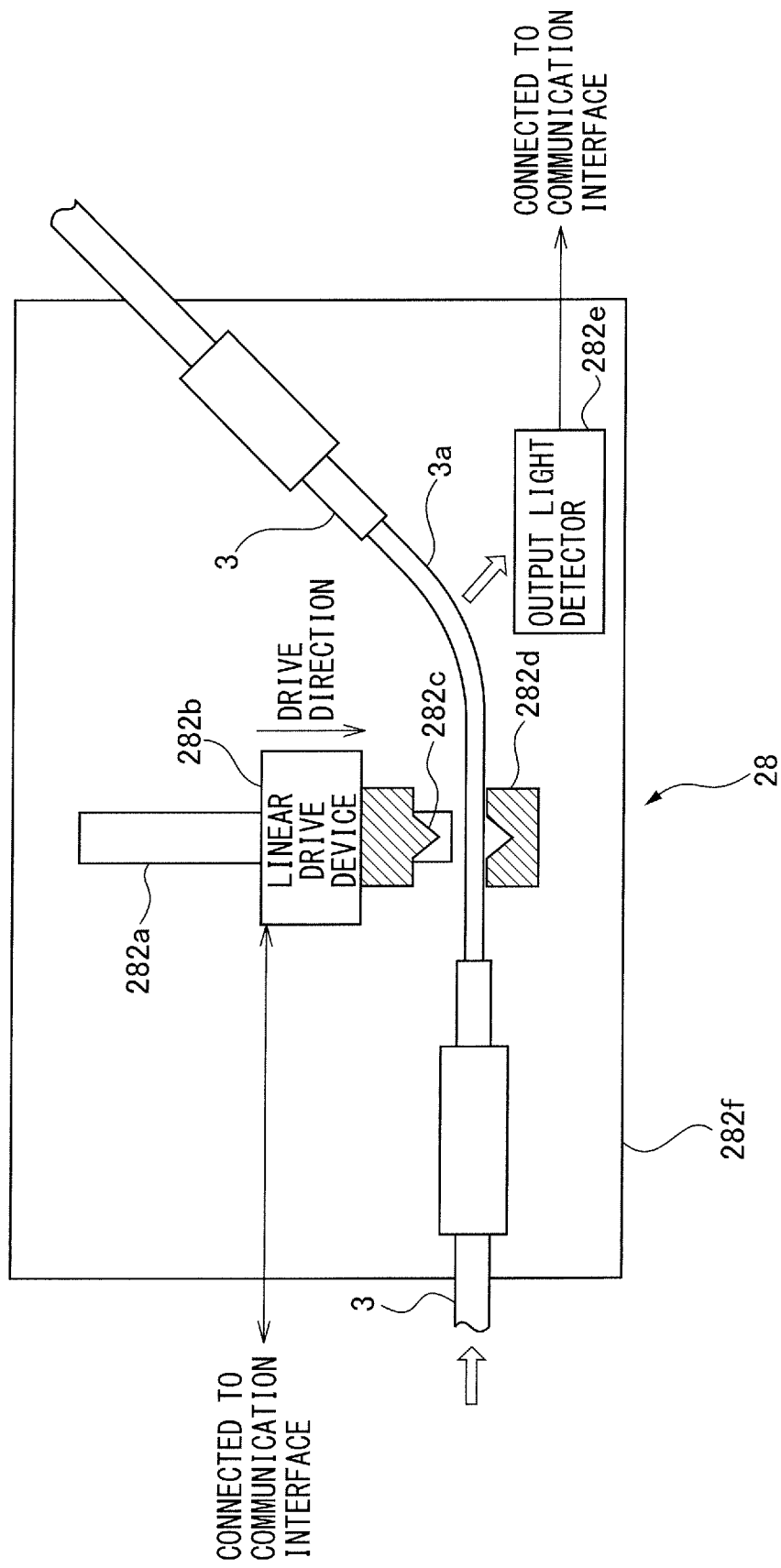
FIG. 5 is a diagram illustrating another example of a configuration of the optical fiber breakage device.

FIG. 5 is a diagram illustrating another example of a configuration of the optical fiber breakage device 28. In this example, as illustrated in FIG. 5, the optical fiber breakage device 28 presses an edge 282c against the optical fiber 3 by moving a linear drive device 282b along a drive direction illustrated in the drawing along a linear drive guide rail 282a, applies pressure to a portion 3a acquired by removing a protective coating of the optical fiber 3 between an edge pad 282d and the edge 282c, to bend the portion 3a at an acute angle. Then, the optical fiber breakage device 28 may be configured to generate a fiber fuse with a loss portion generated in the portion 3a as a starting point by an abrupt increase in a bending loss, and effectively break the optical fiber 3. An output light detector 282e, such as a photodiode, that detects, due to the generation of the fiber fuse, output light propagating in a direction opposite to a direction toward a laser oscillator 21 may be disposed. Then, the optical fiber breakage device 28 may use, as a breakage occurrence signal, a sharp decrease (for example, a decrease amount of a light amount in the latest certain period being equal to or greater than a predetermined threshold value) in a light amount of the output light propagating in the direction opposite to the direction toward the laser oscillator 21, which is detected by the output light detector 282e. In a case of FIG. 5, the output light detector 282e detects output light leaking from a core due to a bending, loss caused by gently bending a part of the portion 3a acquired by removing the protective coating of the optical fiber 3. Signal lines of the linear drive device 282b and the output light detector 282e may be connected to the communication interface 11 of the laser control device 1. Note that, in this example also, each unit of the optical fiber breakage device 28 is housed in a light-shielding housing 282f.

Figure 6:
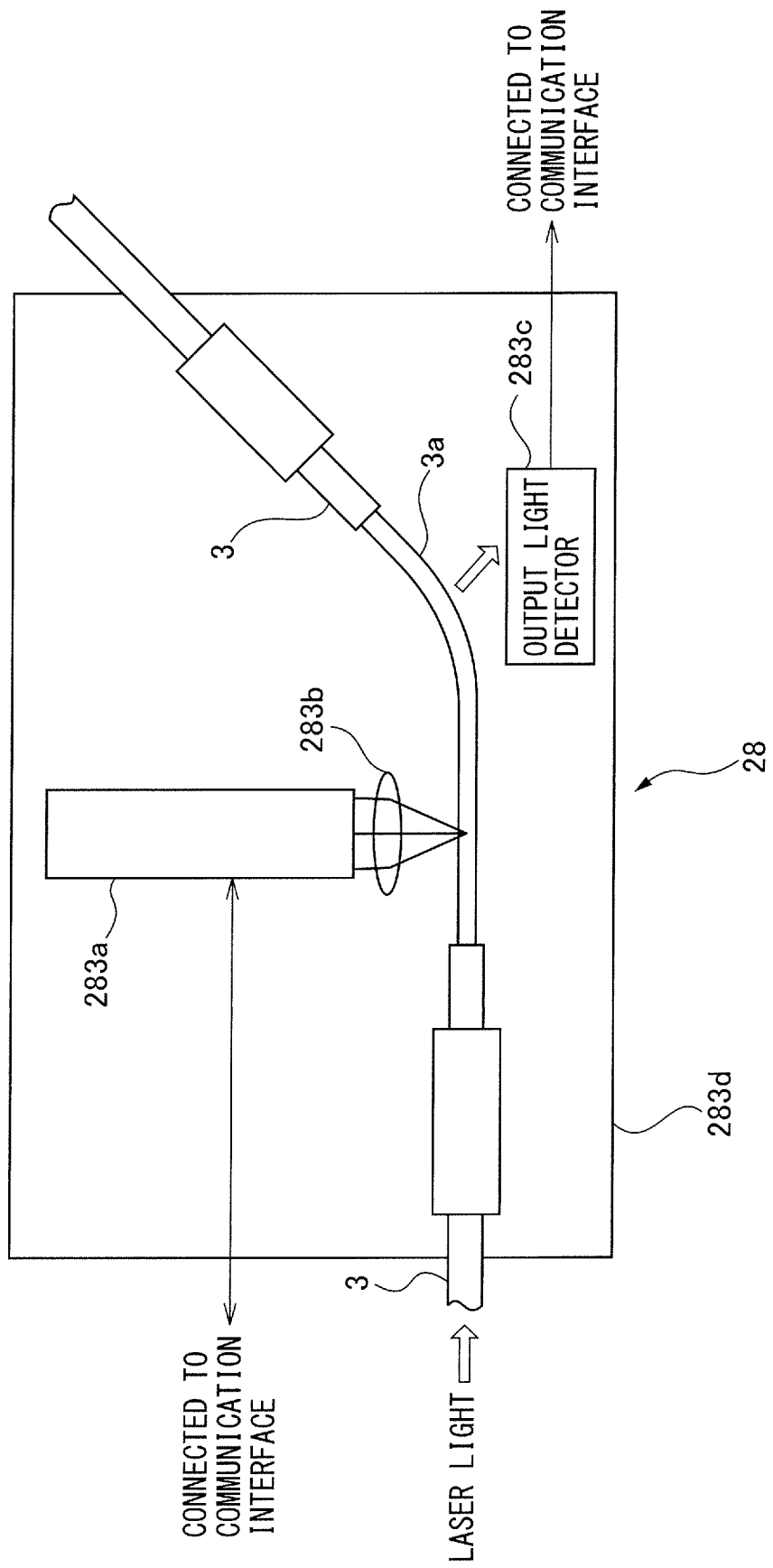
FIG. 6 is a diagram illustrating still another example of a configuration of the optical fiber breakage device.

FIG. 6 is a diagram illustrating still another example of a configuration of the optical fiber breakage device 28. In this example, as illustrated in FIG. 6, the optical fiber breakage device 28 includes a laser oscillator 283a that emits laser light having a wavelength different from a wavelength of output laser light of the laser oscillator 21 of the laser device 2 and a wavelength that can be detected by the output light detector 23 and the return light detector 24, without directly affecting a detection result of the output light detector 23 and the return light detector 24. Then, the optical fiber breakage device 28 condenses the laser light emitted from the laser oscillator 283a by a condensing optical system 283b, irradiates a portion 3a acquired by removing a protective coating of the optical fiber 3 with the laser light, and locally heats the optical fiber 3 to a high temperature. In this way, the optical fiber breakage device 28 generates a fiber fuse in the portion 3a, to effectively break the optical fiber 3. In this case, similarly to the example illustrated in FIG. 5, an output light detector 283c, such as a photodiode, that detects, from the generation of the fiber fuse, output light propagating in a direction opposite to a direction toward the laser oscillator 21 may be disposed. Then, the optical fiber breakage device 28 may use, as a breakage occurrence signal, a sharp decrease (for example, a decrease amount of a light amount in the latest certain period being equal to or greater than a predetermined threshold value) in a light amount of the output light propagating in the direction opposite to the direction toward the laser oscillator 21, which is detected by the output light detector 283c. Similarly to the example illustrated in FIG. 5, the output light detector 283c detects output light leaking from a core due to a bending loss caused by gently bending a part of the portion 3a acquired by removing the protective coating of the optical fiber 3. Signal lines of the laser oscillator 283a and the output light detector 283c may be connected to the communication interface 11 of the laser control device 1. Note that, in this example also, each unit of the optical fiber breakage device 28 is housed in a light-shielding housing 283*d*.

As described above, a change in light amount detected by the scattered light detector or the output light detector is used as the breakage occurrence signal in the optical fiber breakage device 28 illustrated in FIGS. 4 to 6. However, an optical fiber breakage command output from the learning control unit 135 to the optical fiber breakage device 28 may be used as the breakage occurrence signal. In this case, the scattered light detector and the output light detector may be omitted in the optical fiber breakage device 28.

Figure 7:
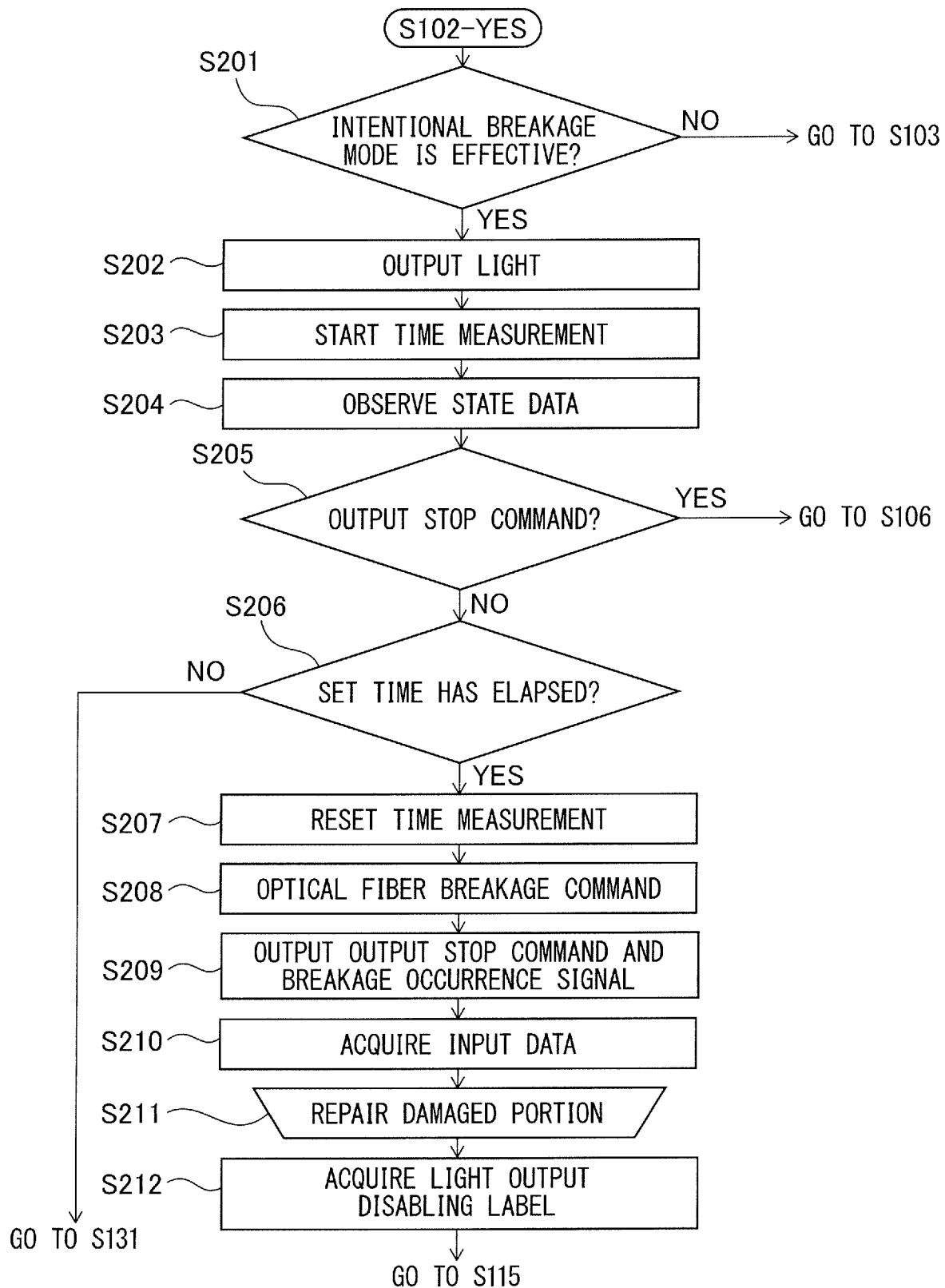
FIG. 7 is a flowchart illustrating one example of a learning process of the laser control device according to the second embodiment of the present invention.

FIG. 7 is a flowchart illustrating one example of a learning process of the laser control device 1 according to the present embodiment, and is also one example of a learning process in a laser control method according to the present invention.

In the learning process according to the present embodiment, processing of determining whether or not an intentional breakage mode is set to be effective in step S201 when there is a light output command in the determination of presence or absence of the light output command in step S102 in the flowcharts illustrated in FIGS. 2A to 2C, and processing of steps S202 to S212 applied when the intentional breakage mode is determined to be effective are added. Thus, the flowchart illustrated in FIG. 7 illustrates the processing of steps S201 to S212. Details of the processing in the other step may be referred to the flowcharts in FIGS. 2A to 2C and related description.

The laser control device 1 starts learning a learning model, and the learning control unit 135 determines whether or not the control circuit 25 of the laser device 2 is requested to output the light output command. Then, when outputting of the light output command is requested (step S102-Yes), i.e., when the light output command is newly output or when the light output command being previously output remains without completing execution of the light output command, the learning control unit 135 determines whether or not the intentional breakage mode is set to be effective (step S201). The intentional breakage mode is a mode of intentionally breaking the optical fiber 3 by using the optical fiber breakage device 28. When the intentional breakage mode is set to be ineffective (step S201-No), the learning control unit 135 executes the processing in and after step 103 in the flowcharts illustrated in FIGS. 2A to 2C.

On the other hand, when the intentional breakage mode is set to be effective (step S201-Yes), the learning control unit 135 outputs a control signal for allowing outputting of laser light in accordance with the light output command to the control circuit 25 via the communication interface 11. Then, the control circuit 25 outputs the light output command to the laser oscillator 21, and thus the laser light is output from the laser oscillator 21 (step S202). Furthermore, the learning control unit 135 starts a time measurement until an intentional breakage of the optical fiber 3 is performed (step S203). The state observation unit 131 always acquires, from the control circuit 25, environmental data and state data about the laser device 2 including a measurement value of a light amount of laser output light and a measurement value of a light amount of return light, and also always observes whether or not the control circuit 25 detects occurrence of an abnormality and outputs an output stop command. When the occurrence of the abnormality is detected, the state observation unit 131 acquires a signal indicating the detection of the occurrence of the abnormality from the control circuit 25 via the communication interface 11 (step S204).

The learning control unit 135 determines whether or not the control circuit 25 detects the occurrence of the abnormality, i.e., whether or not the output stop command is output via the state observation unit 131 (step S205). When the output stop command is output (step S205-Yes), as described later, the output stop command is output before a lapse of a set time until the optical fiber breakage device 28 performs an intentional breakage of the optical fiber 3 by a command from the learning control unit 135. In other words, the intentional breakage of the optical fiber 3 is not performed. Thus, the learning control unit 135 executes the processing in and after step 106 in the flowcharts illustrated in FIGS. 2A to 2C.

On the other hand, when it is determined that the output stop command is not output from the control circuit 25 (step S205-No), the learning control unit 135 determines whether or not a lapse of time since the measurement has started in step S204 has reached a time set as a time until the intentional breakage is performed (step S206). When it is determined that the lapse of time has not reached the set time (step S206-No), the learning control unit 135 executes the processing in and after step S131 in the flowcharts in FIGS. 2A to 2C.

On the other hand, when it is determined that the lapse of time has reached the set time (step S206-Yes), the learning control unit 135 resets the lapse of time being measured (step S207). Then, the learning control unit 135 outputs an optical fiber breakage command to the optical fiber breakage device 28 (step S208). Then, a breakage of the optical fiber 3 is performed. By breaking the optical fiber 3, the control circuit 25 detects occurrence of an abnormality from a detection result of a light amount of laser output light by the output light detector 23, a detection result of a light amount of return light by the return light detector 24, or the like, and outputs the output stop command. Further, the optical fiber breakage device 28 or the learning control unit 135 outputs a breakage occurrence signal (step S209). Subsequently, the learning control unit 135 reads from the memory 12, as input data, at least any of the state data and the environmental data in a predetermined period between the time going back a first predetermined period from the stop command time at which the control circuit 25 outputs the output stop command and the time after a lapse of a second predetermined period since the stop command time (step S210). Further, a damaged portion of the optical fiber 3, i.e., a broken portion of the optical fiber 3 is repaired by re-fusion after a portion in the vicinity of the broken portion is removed from the optical fiber 3 (step S211). Since the optical fiber 3 is broken, it is clear that the laser device 2 is in a state in which the control circuit 25 may not re-output the light output command. Thus, the label acquisition unit 132 acquires the breakage occurrence signal as a light output disabling label (step S212). Subsequently, the learning control unit 135 executes the processing in and after step S115 in the flowcharts illustrated in FIGS. 2A to 2C.

As described above, the learning process illustrated in the flowchart in FIG. 7 illustrates one example of the method of training the learning model being one example of the classifier that determines whether or not the light output command may be re-output with, as an input, at least any of the state data and the environmental data in the predetermined period including the time when occurrence of an abnormality is detected and the laser light output is stopped in the laser device that includes the laser oscillator and the laser optical system including the optical fiber through which the laser output light emitted from the laser oscillator propagates.

The large number of pieces of the teacher data each including a pair of the light output disabling label and the corresponding input data are needed in order to appropriately train the learning model in such a way that accuracy of determining re-outputting of the light output command becomes excellent, but a state in which the optical fiber and the like are damaged needs to be achieved for acquisition of the light output disabling label. However, the laser device is generally expensive, and, when a place that cannot be easily repaired is damaged, repair needs a high cost. Thus, there is a problem in that an acquisition cost of the teacher data including a pair of the light output disabling label and the corresponding input data becomes extremely high. Further, an extremely long time is also needed to acquire the large number of pieces of the teacher data. Thus, as in the present embodiment, by intentionally breaking the optical fiber in a position (or a section) in which the laser device can be functionally restored by re-fusion of the optical fiber, the teacher data including a pair of the light output disabling label and the corresponding input data essential to appropriate training of the learning model can be acquired at a relatively low cost. Further, according to the present embodiment, since the optical fiber is intentionally broken, the large number of pieces of the teacher data can be acquired in a relatively short time, and thus a progress speed of learning can also be increased.

Further, according to a modification example of the present embodiment, the light output disabling label may also include information related to a damaged portion and a damage state being reasons for disabling re-outputting of the light output command from the control circuit of the laser device (hereinafter, which may be referred to as damage information). In this case, when a determination result indicating that the re-outputting of the light output command is disabled is output, the learning unit 134 may train the learning model in such a way as to output, to input data, not only information indicating whether to enable or disable the re-outputting of the light output command but also information indicating an estimated damaged portion and an estimated damage state (hereinafter, which may be referred to as estimated damage information). In this case, the learning unit 134 can also train the learning model in such a way as to output the estimated damage information by applying a predetermined learning technique, such as a back propagation method, to the training of the learning model by using the teacher data including a pair of the light output disabling label including the damage information and the corresponding input data. Note that, in this case, the optical fiber breakage device 28 is preferably installed in such a way as to be able to change a position of the optical fiber 3 broken by the optical fiber breakage device 28 in such a way as to be able to change the damaged portion.

Specifically, in the flowchart in FIG. 7, the light output disabling label acquired in step S212 may also include, together with information that light output is disabled, the damage information, i.e., information about a position of the optical fiber 3 being intentionally broken (i.e., a damaged portion) and a damage state that is clarified during repair of the damaged portion in step S211. Similarly, the light output disabling label acquired in step S114 in the flowcharts in FIGS. 2A to 2C may also include, together with information that light output is disabled, the damage information, i.e., a damaged portion and a damage state that is clarified during repair of the damaged portion in step S113 or step S125. The damage information may be input via the input device 26, for example. At this time, the entire optical fiber 3 is sectionalized into a plurality of sections and a label is assigned to each of the plurality of sections, and then the damaged portion is indicated by a label of a section including the damaged portion, for example. Further, the damage state may be indicated as any of a plurality of ranks each representing a degree of damage, for example. In this way, as the training of the learning model progresses, when the control circuit 25 outputs the output stop command and new input data are acquired, the learning model can output not only a determination result indicating whether to enable or disable the re-outputting of the light output command, but also estimated damage information representing the determination reason when the determination result indicates that the re-outputting of the light output command from the control circuit 25 is disabled.

When the learning model outputs the determination result indicating that the re-outputting of the light output command from the control circuit 25 is disabled, the damaged place needs to be identified, and restoration of the laser device 2 or the optical fiber 3 needs to be attempted. Thus, as in the modification example, by outputting the estimated damage information from the learning model, time needed to restore the laser device 2 or the optical fiber 3 can be reduced. Among the teacher data including a pair of the light output disabling label and the corresponding input data, it is particularly easy for the teacher data including the pair appeared by intentionally breaking the optical fiber 3 in the section of the optical fiber 3 in which the laser device 2 can be functionally restored by re-fusion of the optical fiber 3 to include damage information being a reason for disabling the re-outputting of the light output command in the light output disabling label.

Note that, also in the first embodiment, the light output disabling label acquired in step S114 may include a damaged portion and a damage state that is clarified during repair of the damaged portion in step S113 or step S125. In this way, as the training of the learning model progresses, when the control circuit 25 outputs the output stop command and new input data are acquired, the learning model can output not only a determination result indicating whether to enable or disable the re-outputting of the light output command but also estimated damage information indicating the damaged portion and the damage state representing the determination reason when the determination result indicates that the re-outputting of the light output command from the control circuit 25 is disabled. Similarly to the case in the present embodiment, there is an effect that can reduce time needed until restoration. Note that the estimated damage information may include only either one of the damaged portion or the damage state.

Next, a laser control device according to a third embodiment will be described. The laser control device according to the third embodiment further improves accuracy of determining whether to enable or disable re-outputting of a light output command from a control circuit by successively updating a classifier in accordance with a predetermined reinforcement learning technique by using environmental data and state data about a laser device at the time, each time the control circuit of the laser device detects some sort of abnormality and stops laser light output.

Note that the laser control device according to the third embodiment is different from the laser control device according to the first embodiment in processing executed by a processor, particularly, processing related to training of the classifier. Thus, hereinafter, the processing executed by the processor of the laser control device will be described. Details of the laser device to be controlled by the laser control device and each component of the laser control device other than the processor may be referred to the description of the corresponding component in the first embodiment.

Figure 8:
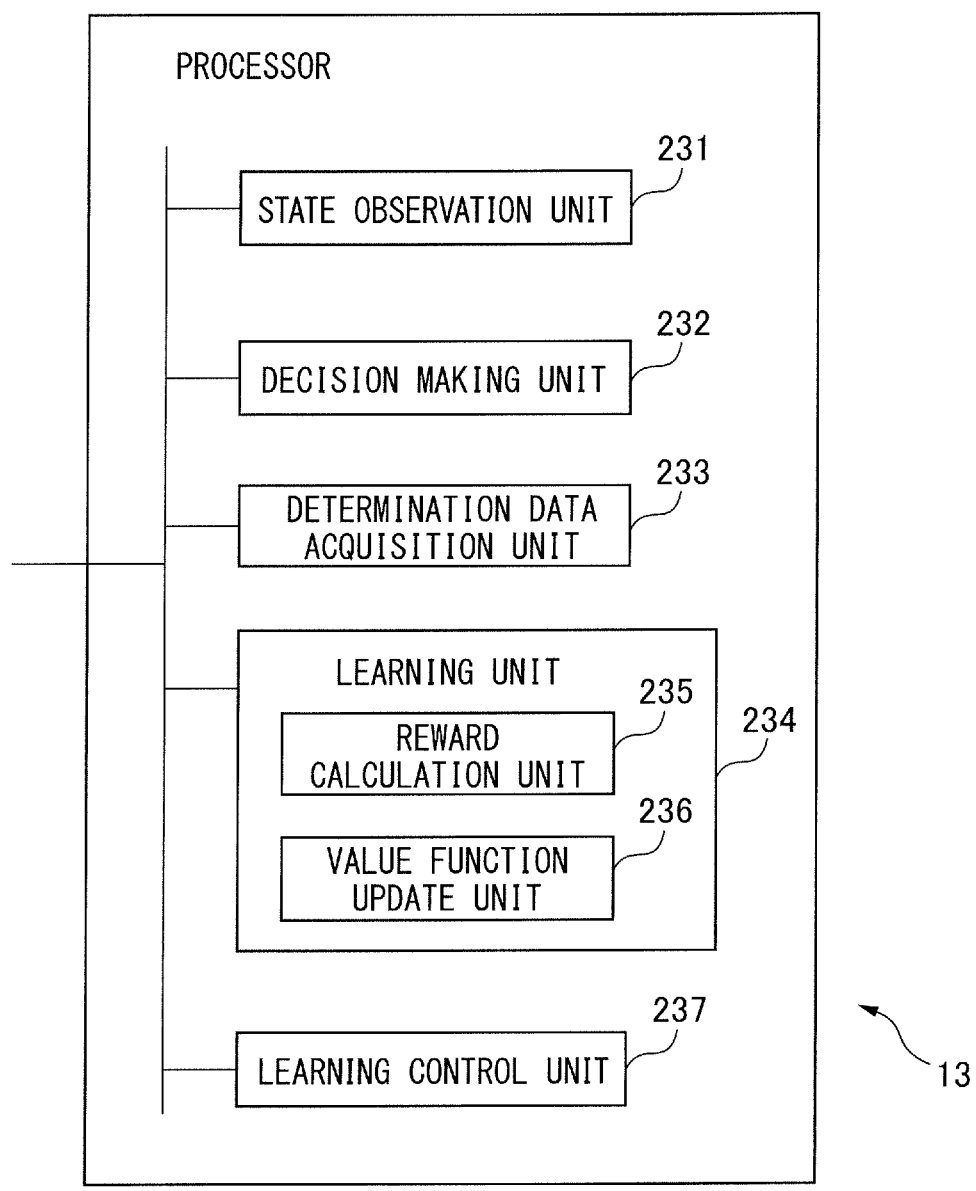
FIG. 8 is a functional block diagram of a processor of a laser control device according to a third embodiment of the present invention.

FIG. 8 is a functional block diagram illustrating the processor of the laser control device according to the third embodiment of the present invention. A processor 13 of a laser control device 1 according to the present embodiment includes a state observation unit 231, a decision making unit 232, a determination data acquisition unit 233, a learning unit 234, and a learning control unit 237. The learning unit 234 further includes a reward calculation unit 235 and a value function update unit 236. Each of the units of the processor 13 is, for example, a functional module achieved by a computer program executed on the processor 13. Alternatively, each of the units may be mounted as a dedicated arithmetic circuit mounted on a part of the processor 13. Further, similarly to the first embodiment, the processor 13 may not need to be constituted of one processor, and a separate dedicated processor for executing processing of the learning unit 234 having a great calculation load in particular and the like may be provided.

The state observation unit 231 observes environmental data and state data about a laser device 2, which are used as input data to a classifier, similarly to the state observation unit 131 in the first embodiment. The state observation unit 231 continuously acquires the state data and the environmental data via a communication interface 11, and stores the state data and the environmental data in a memory 12. Note that the state data and the environmental data can be data similar to the state data and the environmental data in the embodiments described above. Further, among each piece of data included in the state data and the environmental data, one or more pieces of input data used for determining whether to enable or disable re-outputting of a light output command can be data similar to the input data in the embodiments described above.

The decision making unit 232 is another example of a determination unit, decides behavioral data based on a value function assigning weights to one or more pieces of input data, and outputs the decided behavioral data to a control circuit 25 of the laser device 2 via the communication interface 11. The value function is another example of the classifier. The behavioral data indicate whether to enable or disable the re-outputting of the light output command from the control circuit 25, when the control circuit 25 detects occurrence of an abnormality, based on a measurement result of a light amount of laser output light by the output light detector 23 and a measurement result of a light amount of return light by the return light detector 24, and outputs an output stop command to a laser oscillator 21. In the present embodiment, the decision making unit 232 decides behavioral data about any of enabling and disabling of the re-outputting of the light output command from the control circuit 25, based on a value function, for at least any of state data and environmental data (i.e., input data) in a predetermined period between the time going back a first predetermined period from the output stop time at which the control circuit 25 outputs the output stop command and the time after a lapse of a second predetermined since the output stop time, and outputs the decided behavioral data to the control circuit 25. Note that the first predetermined period and the second predetermined period can be the same as the first predetermined period and the second predetermined period in the first embodiment.

The determination data acquisition unit 233 acquires determination data for determining whether the behavioral data are correct or incorrect when the control circuit 25 takes action related to the re-outputting of the light output command in accordance with the behavioral data output from the decision making unit 232.

The learning unit 234 trains a value function in accordance with a predetermined reinforcement learning technique such as Q learning. For this purpose, the learning unit 234 includes the reward calculation unit 235 and the value function update unit 236.

The reward calculation unit 235 calculates a reward value (for example, a Q value) from the determination data in accordance with the predetermined reinforcement learning technique. For this purpose, the reward calculation unit 235 determines whether the behavioral data are correct or incorrect, based on the determination data. When the behavioral data are correct, the reward calculation unit 235 calculates a reward value in such a way that the reward value is positive. On the other hand, when the behavioral data are incorrect, the reward calculation unit 235 calculates a reward value in such a way that the reward value is negative. For example, when, at least, the decision making unit 232 outputs behavioral data indicating enabling of the re-outputting of the light output command, the control circuit 25 of the laser device 2 re-Outputs the light output command to the laser oscillator 21 in accordance with the output from the decision making unit 232, and, as a result, damage in the laser device 2 does not expand, the behavioral data are correct. Thus, the reward calculation unit 235 calculates a reward value in such a way that the reward value is positive. On the other hand, for the behavioral data indicating enabling of the re-outputting of the light output command, when damage in the laser device 2, i.e., damage in the laser oscillator 21, a laser optical system 22, or an optical fiber 3 expands, the behavioral data are incorrect. Thus, the reward calculation unit 235 calculates a reward value in such a way that the reward value is negative.

The value function update unit 236 trains a value function by trial and error in such a way as to acquire behavioral data optimum for input data, based on the determination data, by successively updating the value function in accordance with the predetermined reinforcement learning technique in response to the reward value acquired by the reward calculation unit 235. Note that a learning result of supervised learning, which is the learning model in the first embodiment or the second embodiment, may be used as an initial value of the value function.

No human is preferably involved in acquisition of the determination data being used for determining whether the behavioral data, which are output from the decision making unit 232, indicating whether to enable or disable the re-outputting of the light output command from the control circuit 25 are correct or incorrect. However, when damage that disables the re-outputting of the light output command was found as a result of disassembling and investigating the laser device 2 by a human, and the like, the human may input the determination data via an input device 26. Then, the determination data acquisition unit 233 may acquire the determination data being input from the input device 26 via, for example, the control circuit 25 and the communication interface 11.

The learning control unit 237 controls a learning process, similarly to each of the embodiments described above. For this purpose, the learning control unit 237 controls communication with the control circuit 25 of the laser device 2 via the communication interface 11 for acquisition of the state data and the like by the state observation unit 231, acquisition of the determination data by the determination data acquisition unit 233, and the like. Further, the learning control unit 237 controls delivery of various data between the units in the processor 13, reading of various data from the memory 12, and writing of various data to the memory 12. For example, when the learning control unit 237 is notified that occurrence of an abnormality is detected from the control circuit 25, the learning control unit 237 reads the state data and the like in the predetermined period described above from the memory 12 (for example, a ring buffer) and passes the state data and the like to the decision making unit 232.

Figure 9A:
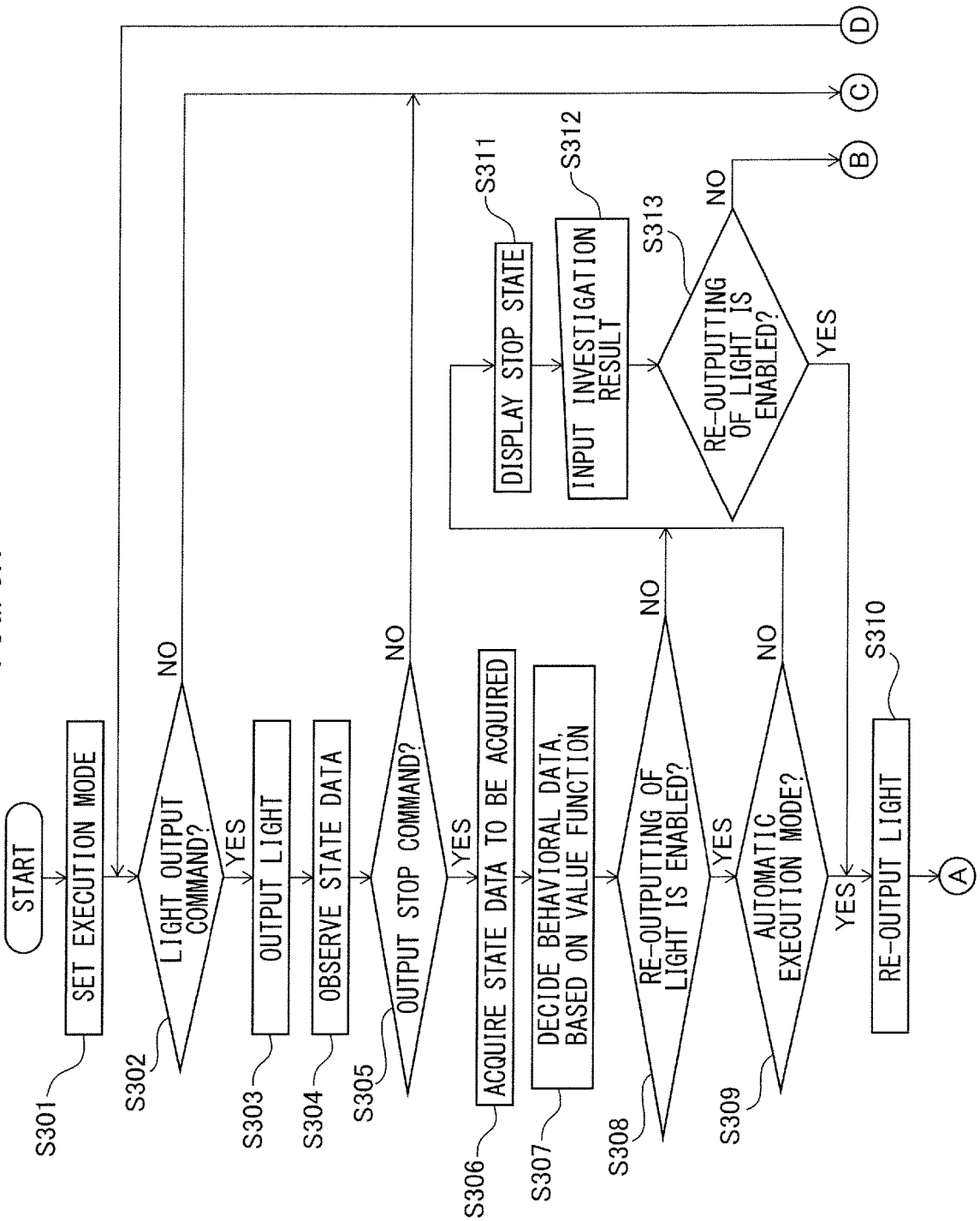
FIGS. 9A and 9B are each a flowchart illustrating one example of a learning process of a value function by the laser control device according to the third embodiment of the present invention.
Figure 9B:
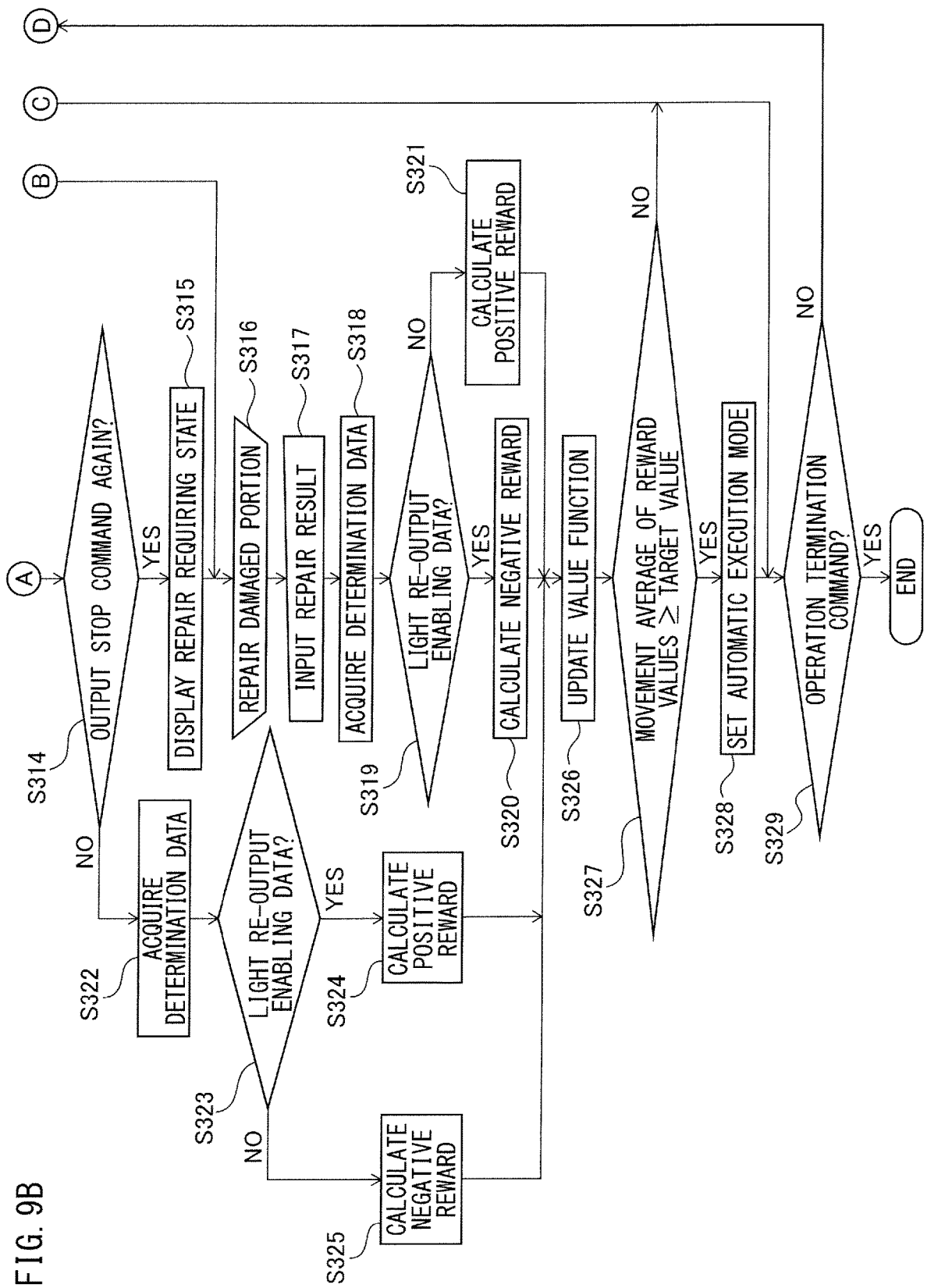

FIGS. 9A and 9B are each a flowchart illustrating one example of a learning process of a value function by the laser control device 1 according to the present embodiment.

When the laser control device 1 starts operating, first, the learning control unit 135 sets an execution mode to an automatic execution mode or a non-automatic execution mode, which is not essential processing in the learning process of the value function according to the present embodiment (step S301). The automatic execution mode is an execution mode of allowing the control circuit 25 of the laser device 2 to automatically re-output a light output command in a case in which the laser control device 1 outputs behavioral data indicating that the re-outputting of the light output command from the control circuit 25 is enabled in accordance with a value function being a learning result, when the control circuit 25 detects occurrence of an abnormality and outputs an output stop command and laser light output is stopped. On the other hand, the non-automatic execution mode is an execution mode of disallowing the control circuit 25 to automatically re-output a light output command even when the laser control device 1 outputs the behavioral data indicating that the re-outputting of the light output command from the control circuit 25 is enabled as described above. The meaning of providing this step is to allow insertion of processing of checking a state for whether or not a human can determine that the light output command may be re-output for caution's sake, even when the laser control device 1 outputs the behavioral data indicating that the re-outputting of the light output command from the control circuit 25 is enabled in accordance with a value function, until a learning level of the value function becomes advanced in such a way as to reach a target level. In this way, in a case of a high probability that the optical fiber 3, the laser optical system 22, or the laser oscillator 21 is seriously damaged when the learning level of the value function is not yet high and the automatic execution mode is set, occurrence of such damage in the optical fiber 3, the laser optical system 22, or the laser oscillator 21 is suppressed.

Next, the learning control unit 237 determines whether or not the control circuit 25 is requested to output the light output command (step S302). When the control circuit 25 is requested to output the light output command (step S302-Yes), the learning control unit 237 outputs a control signal for allowing outputting of laser light in accordance with the light output command to the control circuit 25 via the communication interface 11. Then, the control circuit 25 outputs the light output command to the laser oscillator 21, and thus the laser light is output from the laser oscillator 21 (step S303).

The state observation unit 231 always acquires, from the control circuit 25, environmental data and state data about the laser device 2 including a measurement value of a light amount of laser output light and a measurement value of a light amount of return light. Further, the state observation unit 231 always observes whether or not the control circuit 25 detects occurrence of an abnormality and outputs the output stop command. When the occurrence of the abnormality is detected, the state observation unit 231 acquires a signal indicating the detection of the occurrence of the abnormality from the control circuit 25 via the communication interface 11 (step S304).

The learning control unit 237 determines whether or not the control circuit 25 detects the occurrence of the abnormality, i.e., whether or not the output stop command is output via the state observation unit 231 (step S305). When the output stop command is output (step S305-Yes), the learning control unit 237 reads from the memory 12 (for example, a ring buffer), as input data, at least any of the state data and the environmental data in the predetermined period described above including the stop command time at which the control circuit 25 outputs the output stop command (step S306).

The decision making unit 232 decides behavioral data by inputting the read input data to a value function (step S307). As described above, the behavioral data in the learning process are data indicating behavior that enables the re-outputting of the light output command from the control circuit 25 (i.e., light re-output enabling data) or data indicating behavior that disables the re-outputting of the light output command from the control circuit 25 (i.e., light re-output disabling data), in a state in which the light output command is output from the control circuit 25 to the laser oscillator 21 and laser light output is stopped.

Next, the learning control unit 237 determines whether the behavioral data output from the decision making unit 232 are the light re-output enabling data or the light re-output disabling data (step S308). When it is determined that the behavioral data is the light re-output enabling data (step S308-Yes), the learning control unit 237 determines whether the execution mode is set to the automatic execution mode or the non-automatic execution mode (step S309). When the execution mode is set to the automatic execution mode (step S309-Yes), the learning control unit 237 orders, via the communication interface 11, the control circuit 25 to re-output the light output command to the laser oscillator 21, and the laser light is re-output (step S310).

On the other hand, when the execution mode is set to the non-automatic execution mode as in a case in which a learning level of the value function is insufficient (step S309-No), the display device 27 displays that the laser device 2 is in a stop state because the output stop command is output from the control circuit 25 (Step S311). Note that the control circuit 25 may simultaneously sound a buzzer (not illustrated) and the like in order to make a human (person in charge) aware early of the stop state of the laser device 2: In this case, after the laser device 2 is in the stop state, a human (person in charge) disassembles and investigates a portion of the laser device 2 or the optical fiber 3 suspected of damage, and checks for the presence or absence of the damaged portion or a state of the laser device 2 or the optical fiber 3. Then, the investigation result is input via the input device 26 (step S312). The investigation result also includes a conclusion that the re-outputting of the laser light is enabled or disabled. Thus, the learning control unit 237 determines whether to enable or not the re-outputting of the laser light in accordance with the input investigation result (step S313). When the re-outputting of the laser light is enabled (step S313-Yes), the learning control unit 237 executes the processing in and after step S310. In this way, the laser light is re-output.

As a result of the re-outputting of the laser light in step S310, the learning control unit 237 determines whether or not the output stop command is re-output from the control circuit 25 via the state observation unit 231 (step S314). When it is determined that the output stop command is re-output from the control circuit 25 (step S314-Yes), it is expected that there is a damaged portion in the laser device 2 or the optical fiber 3, and the laser device 2 or the optical fiber 3 is in a state of needing repair. Thus, the learning control unit 237 orders, via the communication interface 11, the control circuit 25 to display that the laser device 2 or the optical fiber 3 is in a repair requiring state on the display device 27 and the like (step S315). Then, for example, repair is performed on the damaged portion of the laser device 2 or the optical fiber 3 by a human (step S316). Then, the repair result is input via the input device 26 (step S317).

Note that, when the re-outputting of the laser light is disabled in step S313 (step S313-No), the processing in and after step S316 may be executed.

Further, when it is determined that the behavioral data output from the decision, making unit 232 is the light re-output disabling data in step S308 (step S308-No), the learning control unit 237 may execute the processing in and after step S311.

After the repair result is input in step S317, the determination data acquisition unit 233 acquires, as determination data, the behavioral data output from the decision making unit 232 and the repair result input from the input device 26 (step S318). Then, the reward calculation unit 235 determines whether the behavioral data output from the decision making unit 232 is the light re-output enabling data or the light re-output disabling data (step S319). When it is determined that the behavioral data output from the decision making unit 232 in step S307 is the light re-output enabling data (step S319-Yes), the behavioral data output from the decision making unit 232 is incorrect because repair is actually needed in a light re-output disabled state of the laser device 2 or the optical fiber 3 while the behavioral data is the light re-output enabling data. Thus, the reward calculation unit 235 calculates a reward value in such a way that the reward value becomes negative (step S320). On the other hand, when it is determined that the behavioral data output from the decision making unit 232 in step S307 is the light re-output disabling data (step S319-No), the behavioral data output from the decision making unit 232 is correct because the behavioral data is the light re-output disabling data and repair is actually needed in the light re-output disabled state of the laser device 2 or the optical fiber 3. Thus, the reward calculation unit 235 calculates a reward value in such a way that the reward value becomes positive (step S321).

Further, when it is determined that the output stop command is not re-output from the control circuit 25 even after a lapse of a certain period in step S314 (step S314-No), it is estimated that the laser device 2 or the optical fiber 3 is not damaged so that a problem occurs. Accordingly, the laser light can be re-output. Thus, the determination data acquisition unit 233 acquires, as determination data, the behavioral data output from the decision making unit 232 and a fact that a problem does not occur even when the control circuit 25 re-outputs the light output command to the laser oscillator 21 and that re-outputting of the laser light is enabled (step S322). Then, the reward calculation unit 235 determines whether the behavioral data output from the decision making unit 232 is the light re-output enabling data or the light re-output disabling data (step S323). When it is determined that the behavioral data output from the decision making unit 232 in step S307 is the light re-output enabling data (step S323-Yes), the behavioral data output from the decision making unit 232 is correct because the behavioral data is the light re-output enabling data and, as a matter of fact, the re-outputting of the laser light is enabled. Thus, the reward calculation unit 235 calculates a reward value in such a way that the reward value becomes positive (step S324).

On the other hand, when it is determined that the behavioral data output from the decision making unit 232 is the light re-output disabling data (step S323-No), the behavioral data output from the decision making unit 232 is incorrect because the re-outputting of the laser light is actually enabled while the behavioral data is the light re-output disabling data. Thus, the reward calculation unit 235 calculates a reward value in such a way that the reward value becomes negative (step S325).

After step S321, S322, S324, or S325, the value function update unit 236 updates the value function, based on the calculated reward value (step S326). At this time, the value function update unit 236 may update the value function in accordance with the predetermined reinforcement learning technique such as the Q learning, as described above.

Subsequently, the learning control unit 237 determines whether or not a movement average of the reward values is greater than a target value (step S327). The movement average of the reward values is, for example, a movement average value of reward values for the latest 1000 times. When the movement average value of the reward values is greater than the target value (step S327-Yes), it is estimated that the learning level of the value function has reached the target level. Thus, when the execution mode described above is not set to the automatic execution mode, the learning control unit 237 sets the execution mode to the automatic execution mode (step S328). Further, the learning control unit 237 may cause the display device 27 to display that the learning level has reached the target level via the communication interface 11. Further, since the learning level has reached the target level, the learning control unit 237 may output an operation termination command as internal data. The operation termination command may be input from the input device 26 and acquired via the control circuit 25 and the communication interface 11.

Subsequently, the learning control unit 237 determines whether or not the operation termination command is output to the laser control device 2 (step S329). When the operation termination command is output (step S329-Yes), the laser control device 1 terminates the operation.

On the other hand, when the operation termination command is not output (step S329-No), the learning control unit 237 repeats the processing in and after step S302.

Further, when it is determined that the movement average of the reward values is smaller than the target value (step S327-No), when outputting of the light output command is not requested in step S302 (step S302-No), or when it is determined that the output stop command is not output from the control circuit 25 in step S305 (step S305-No), the learning control unit 237 may also execute the processing in step S329. Note that, when the light output command is not output to the laser device 2 in step S302 and the operation termination command is not output in step S329, the learning control unit 237 waits until any of the light output command and the operation termination command is output.

As described above, in the present embodiment, the laser control device can continue to update a value function and advance reinforcement learning of the value function by repeatedly executing the processing from step S302 to step S329 until the operation termination command is issued. Further, the laser control device can output a more reliably accurate determination result (behavioral data) related to whether to enable or disable the re outputting of the light output command from the control circuit to input data, by setting, as an initial value of the value function, a learning model acquired as a learning result of supervised learning in the laser control device in the first embodiment or the second embodiment, and continuing reinforcement learning of the value function.

Note that, when a learning level of the value function reaches a target level, the learning control unit 237 does not need to continue training of the value function any longer. In this case, when the output stop command is output from the control circuit 25 of the laser device 2, the decision making unit 232 may output only behavioral data acquired by inputting, to the value function, input data among state data and environmental data observed by the state observation unit 231 in a predetermined period including the time of outputting the output stop command. Thus, the processing of the determination data acquisition unit 233 and the learning unit 234 may be omitted. Further, determination data are also unnecessary.

According to the modification example, behavioral data indicating that re-outputting of a light output command is disabled may include estimated damage information representing an estimated damaged portion and an estimated damage state as the reasons. In this case, determination data for the behavioral data indicating that the re-outputting of the light output command is disabled may also include information representing a determination result of whether or not the damaged portion and the damage state represented by the estimated damage information included in the behavioral data are correct. Then, when the behavioral data indicating that the re-outputting of the light output command is disabled is output, the reward calculation unit 235 may calculate an additional reward value in such a way that the additional reward value becomes positive when the damaged portion and the damage state represented by the estimated damage information are correct, based on the determination data. On the other hand, the reward calculation unit 235 may calculate an additional reward value in such a way that the additional reward value becomes negative when the damaged portion and the damage state represented by the estimated damage information are incorrect. Then, the reward calculation unit 235 may total the additional reward value for whether the damaged portion and the damage state represented by the estimated damage information are correct or incorrect and the reward value for whether enabling/disabling of the re-outputting of the light output command is correct or incorrect, and output the total reward value. The value function update unit 236 may update the value function in accordance with the total reward value.

In this case, in the flowcharts in FIGS. 9A and 9B, when the decision making unit 232 outputs the behavioral data indicating that the re-outputting of the light output command from the control circuit 25 is disabled in step S307, the estimated damage information is also included in the behavioral data. Further, the damage information representing the damaged portion and the damage state that is clarified from a result of repair is input in the repair result input in step S317. Note that, as in the second embodiment, the laser oscillator 21, the laser optical system 22, and the optical fiber 3 are divided into a plurality of sections and a label is assigned to each of the sections, and then, the damaged portion may be indicated by a section including the damaged portion, for example. Further, the damage state may be indicated as any of a plurality of ranks each representing a degree of damage.

Further, in step S318, a degree of difference between the damaged portion and the damage state represented by the estimated damage information included in the behavioral data output from the decision making unit 232 and the damaged portion and the damage state input as the repair result is also acquired as the determination data. Then, in step S321, while the reward calculation unit 235 calculates a positive total value of an additional reward value for whether the damaged portion and the damage state represented by the estimated damage information are correct or incorrect and a reward value for whether enabling/disabling of the re-outputting of the light output command is correct or incorrect, the reward calculation unit 235 may calculate the additional reward value in such a way as to reduce the additional reward value as the difference is larger, and may, on the Other hand, calculate the additional reward value in such a way as to increase the additional reward value as the difference is smaller. Note that, in the modification example, the estimated damage information may include only either one of the damaged portion or the damage state. In this case, the reward calculation unit 235 may calculate an additional reward value as described above, based on either the damaged portion or the damage state included in the estimated damage information.

According to the modification example, when the decision making unit 232 outputs the behavioral data indicating that the re-outputting of the light output command from the control circuit 25 is disabled, the estimation result of the damaged portion and the damage state is also output, and thus the laser control device can reduce time needed until the laser device 2 is restored.

Further, according to another modification example, when the decision making unit 232 acquires behavioral data indicating that re-outputting of a light output command is disabled by inputting, to a value function, input data in the latest predetermined period among state data and environmental data observed by the state observation unit 231, the decision making unit 232 may further include an emergency stop function of instructing the control circuit 25 of the laser device 2 to immediately output a light output stop command via the communication interface 11. The emergency stop function may be able to switch between effective and ineffective. Note that a length of the predetermined period can be the same as a length from the time going back a first predetermined period from the stop command time to the time after a lapse of a second predetermined period since the stop command time.

Figure 10:
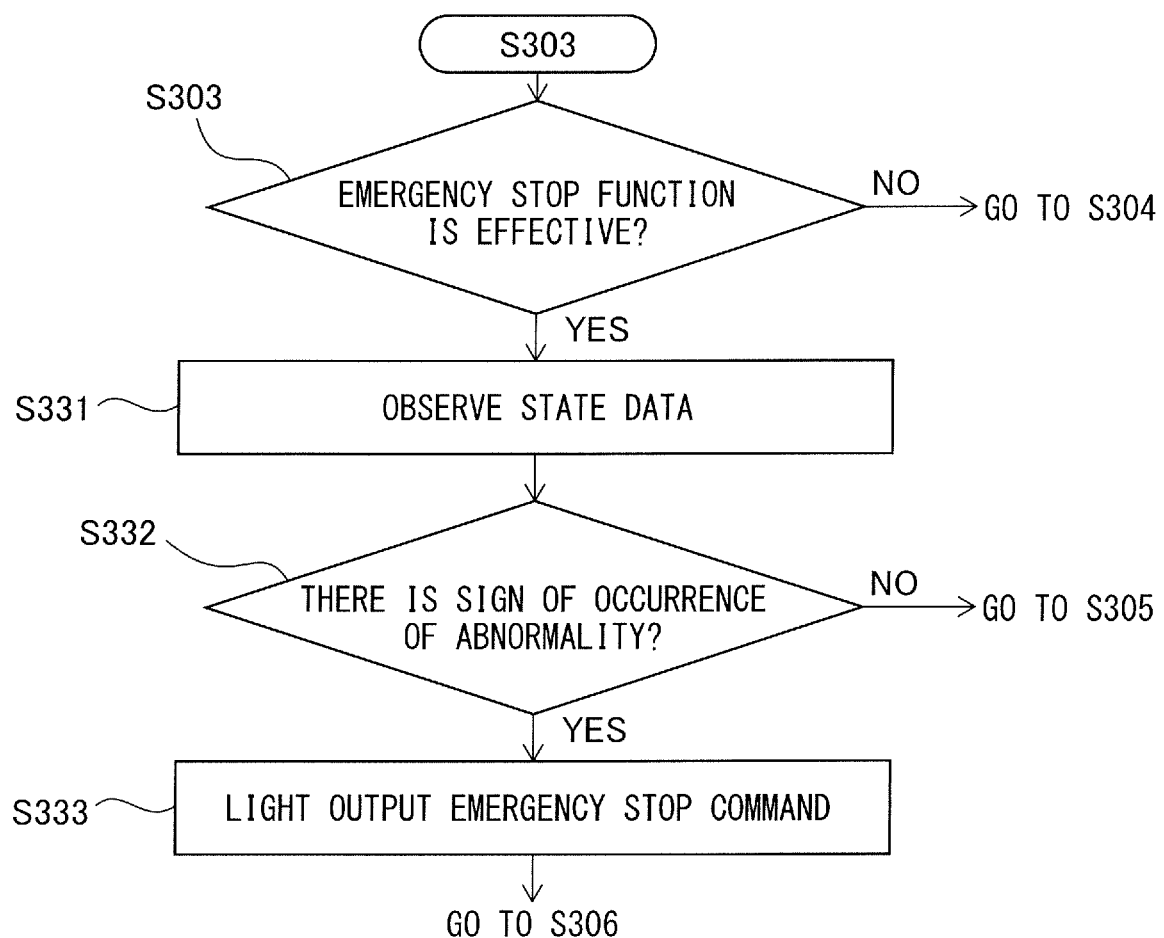
FIG. 10 is a flowchart illustrating another example of a learning process of a value function by the laser control device according to the third embodiment of the present invention.

FIG. 10 is a flowchart illustrating another example of a learning process of a value function when the emergency stop function is included. In the learning process according to the modification example, processing related to a determination of whether the emergency stop function is effective or ineffective and emergency stop processing when the emergency stop function is effective are added, after the processing in step S303 in the flowcharts illustrated in FIGS. 9A and 9B. Thus, the processing in each step other than the processing above described may be referred to the flowcharts in FIGS. 9A and 9B.

When laser light is output from the laser oscillator 21 in step S303, the learning control unit 237 determines whether or not the emergency stop function is effective (step S330). When the emergency stop function is ineffective (step S330-No), the learning control unit 237 executes the processing in and after step S304. In other words, the training of the value function is advanced according to the flowcharts illustrated in FIGS. 9A and 9B. On the other hand, when the emergency stop function is effective (step S330-Yes), the state observation unit 231 always acquires, from the control circuit 25, environmental data and state data about the laser device 2 including a measurement value of a light amount of laser output light and a measurement value of a light amount of return light (step S331). Then, the decision making unit 232 determines whether or not to acquire behavioral data indicating that re-outputting of a light output command is disabled, i.e., whether or not there is a sign of occurrence of an abnormality by inputting, to the value function, input data in the latest predetermined period among the state data and the environmental data observed by the state observation unit 231 (step S332). When the behavioral data indicating that the re-outputting of the light output command is disabled is not acquired (step S332-No), i.e., when there is no sign of the occurrence of the abnormality, the learning control unit 237 may execute the processing in and after step S305. On the other hand, when the behavioral data indicating that the re-outputting of the light output command is disabled is acquired (step S332-Yes), i.e., when there is the sign of the occurrence of the abnormality, the decision making unit 232 outputs, via the communication interface 11, a signal instructing the control circuit 25 to immediately output a light output stop command, i.e., a light output emergency stop command (step S333). Then, the control circuit 25 outputs the light output stop command to the laser oscillator 21, and thus the laser light output is stopped. Subsequently, the learning control unit 237 may execute the processing in and after step S306.

As the training of the value function progresses, a high possibility of occurrence of damage that disables the re-outputting of the light output command in the optical fiber 3 and the like when the laser light output continues may be recognized by using the value function, based on the state data and the environmental data observed by the state observation unit 231, before the control circuit 25 detects the occurrence of the abnormality and outputs the light output stop command. Thus, by adding the function described above, before occurrence of an abnormality is actually detected, the laser control device 1 causes the control circuit 25 to output the light output stop command and stop the laser light output, thereby improving a possibility that occurrence of damage to disable the re-outputting of the light output command is prevented.

Note that the emergency stop function described above is also applicable to the laser control device in the first and second embodiments or the modification example. In this case, when a determination result indicating that the re-outputting of the light output command is disabled is acquired by inputting input data in the latest predetermined period to a learning model by the determination unit, the light output emergency stop command may be output to the control circuit 25 via the communication interface 11.

The reason why the emergency stop function can switch between effective and ineffective is to prevent the advance of the training of the value function from being hampered by making the emergency stop function ineffective in a stage in which a learning level of a value function is still not yet high. For example, in the case when the emergency stop function is applied to the laser control device in the second embodiment, when the optical fiber 3 is intentionally broken at a predetermined position in order to generate a pair sample of input data and a light output disabling label, by making the emergency stop function ineffective, training of the learning model (for example, the generation of the pair sample) is not hampered.

Next, a fourth embodiment will be described. A laser control device according to the fourth embodiment is connected to a plurality of laser devices via a local area network, and a classifier is trained based on state data and environmental data acquired from each of the plurality of laser devices. Furthermore, the laser control device can share the trained classifier with another laser control device connected via a wide area network.

Figure 11:
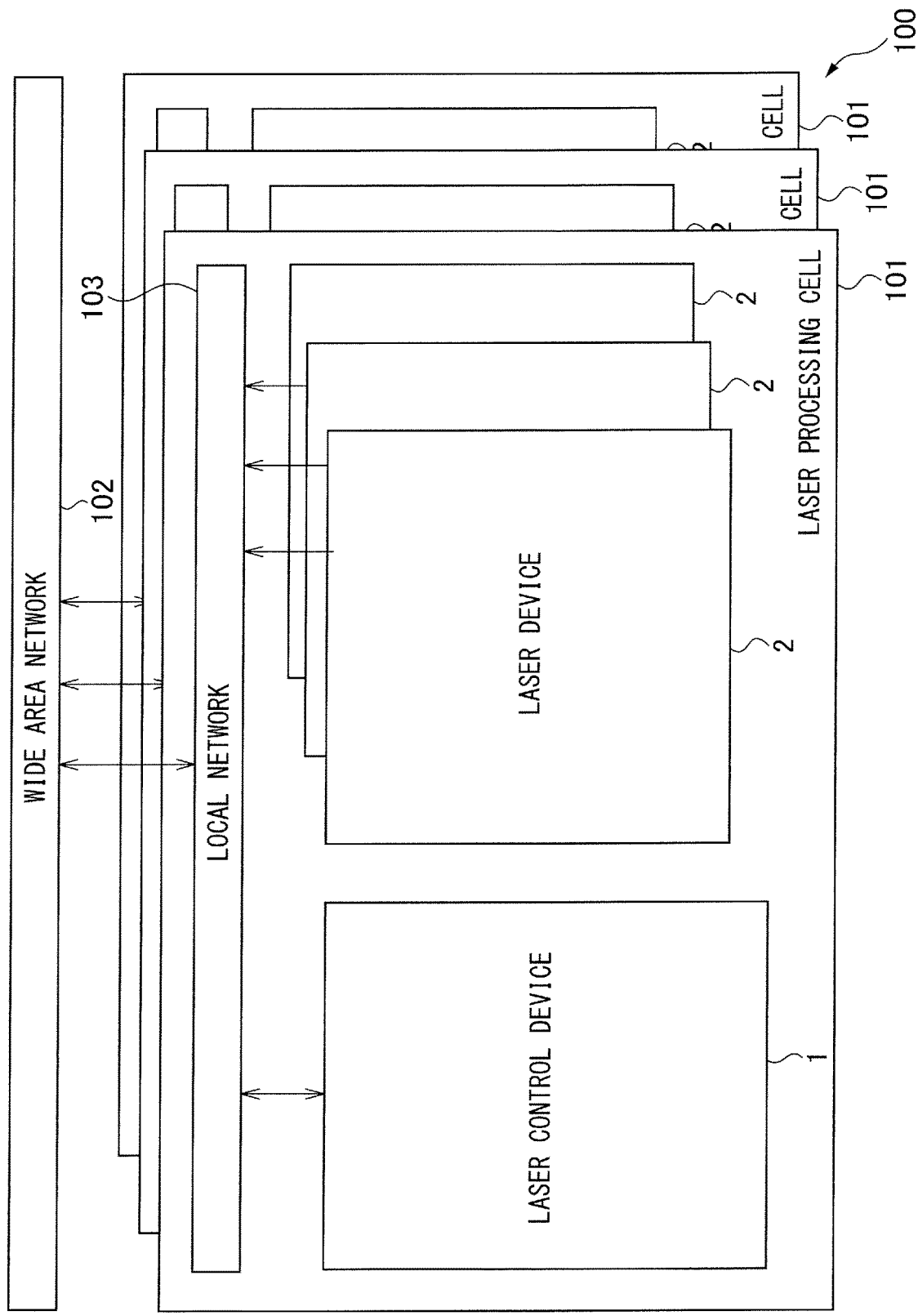
FIG. 11 is a schematic configuration diagram of a laser control system including a laser control device according to a fourth embodiment of the present invention.

FIG. 11 is a schematic configuration diagram of a laser control system including the laser control device according to the fourth embodiment of the present invention. A laser control system 100 according to the present embodiment includes a plurality of laser processing cells 101. The plurality of laser processing cells 101 are communicably connected to each other via a wide area network 102.

Each of the plurality of laser processing cells 101 includes a laser control device 1 and a plurality of laser devices 2. Note that, in each of the laser processing cells 101, the laser control device 1 may be any of the laser control devices according to the first embodiment, the second embodiment, and the third embodiment. Then, in each of the laser processing cells 101, the laser control device 1 and the plurality of laser devices 2 are communicably connected to each other via a local network 103. For example, the communication interface 11 (see FIG. 1 etc.) of the laser control device 1 may include a communication circuit for a connection to the local network 103. Herein, the local network 103 can be a network connected under one relay device including a function of determining an output destination of a signal received via a network in accordance with a transmission destination of the signal, such as a router and a switching hub, for example. On the other hand, the wide area network 102 can be, for example, a network that connects individual local networks 103 to each other.

In each of the laser processing cells 101, the laser control device 1 trains a classifier (such as the learning model in the first and second embodiments or the value function in the third embodiment), based on environmental data, state data about the laser device 2, and a signal indicating detection of occurrence of an abnormality, etc., which are acquired from any of the plurality of laser devices 2 via the local network 103. Furthermore, the laser control device 1 controls each of the plurality of laser devices 2 by outputting a signal indicating whether to enable or disable re-outputting of a light output command and the like to each of the plurality of laser devices 2 via the local network 103.

Further, the laser control device 1 of each of the laser processing cells 101 may share a classifier which has been trained or a classifier during training via the wide area network 102. When the classifier during training is shared, the number of pieces of teacher data used in training, the number of update times of the classifier, or a movement average value of latest reward values may also be shared via the wide area network 102. In this case, the laser control devices 1 included in any of the plurality of laser processing cells 101 may compare a progress situation of training of a classifier of its own device with a progress situation of training of a classifier of another laser processing cell among the plurality of laser processing cells 101, and determine the classifier whose training is advanced as a classifier to be trained subsequently. In this case, a learning control unit of a processor 13 of the laser control device 1 may determine that training of the classifier is more advanced as the number of pieces of teacher data used for training is greater, the number of update times of the classifier is greater, or a movement average value of the latest reward values is greater.

A state observation unit of the laser control device 1 needs to observe state data and environmental data in a predetermined period of an order of 10 ms between the time going back a first predetermined period from the stop command time at which the control circuit 25 of the laser device 2 outputs an output stop command and the time after a lapse of a second predetermined period from the stop command time. As a result, transmission of the state data and the environmental data is required to be on a real-time basis. Thus, in the present embodiment, in each of the laser processing cells, the required real-time transmission can be satisfied by connecting the laser control device to the plurality of (several to 100, for example) laser devices to be controlled by the laser control device with the local network as described above. On the other hand, for sharing of the classifier that does not require the real-time transmission, the laser control system can accelerate progress of training of the classifier in each of the laser control devices by sharing the classifier and information indicating a progress situation of training among the plurality of laser control devices via the wide area network. Furthermore, in the laser control system, the classifier whose training has been completed in the laser control device of any of the laser processing cells can be used by the laser control device of another laser processing cell via the wide area network.

Next, a fifth embodiment will be described. In the fifth embodiment, once a control circuit of a laser device detects occurrence of an abnormality and stops laser light output, the control circuit is in a stop state in which the control circuit does not output a light output command to a laser oscillator even when receiving an instruction to restart the laser light output. Then, a stop state release input unit for releasing the stop state is provided separately from an input device.

Figure 12:
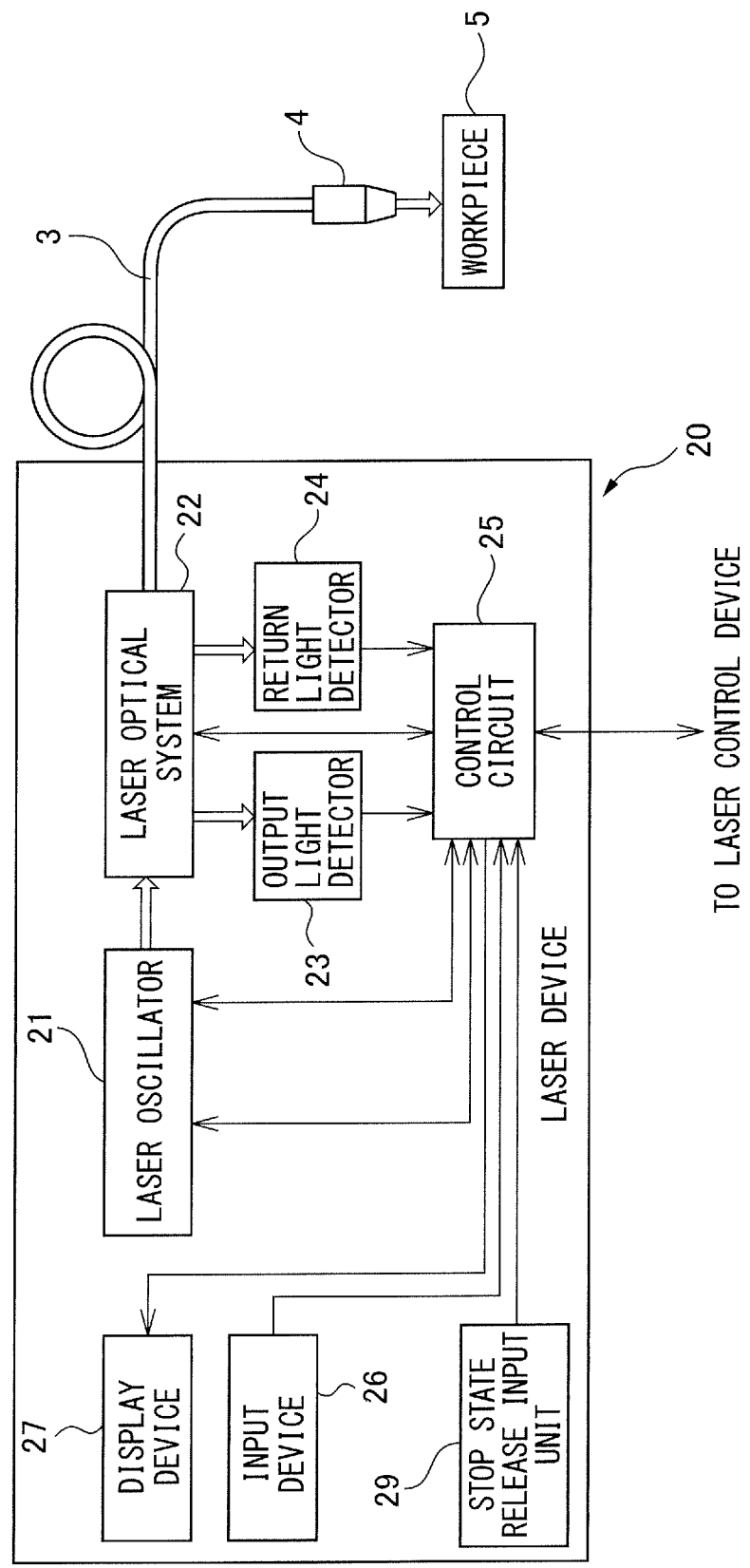
FIG. 12 is a schematic configuration diagram of a laser device according to a fifth embodiment of the present invention.

FIG. 12 is a schematic configuration diagram of the laser device according to the present embodiment. A laser device 20 illustrated in FIG. 12 is different from the laser device 2 illustrated in FIG. 1 in that the laser device 20 includes a stop state release input unit 29 and in a part of an operation of a control circuit 25. Then, hereinafter, the control circuit 25, the stop state release input unit 29, and a related portion thereof will be described. Another component of the laser device 20 and a laser control device 1 may be referred to the description of the corresponding component in each of the embodiments described above. Further, the laser control device 1 according to the present embodiment may be any of the laser control devices according to the first to third embodiments and the modification example.

Similarly to each of the embodiments described above, when the control circuit 25 detects an abnormality occurring in a laser oscillator 21, a laser optical system 22, or an optical fiber 3, based on a measurement value of a light amount of laser output light by an output light detector 23 and a measurement value of a light amount of return light by a return light detector 24, the control circuit 25 outputs an output stop command to the laser oscillator 21 and stops laser light output. Furthermore, for example, the control circuit 25 turns on a stop state flag held as an internal parameter, and shifts to a stop state. In the stop state, the control circuit 25 does not output a light output command to the laser oscillator 21, even when receiving an instruction to restart the laser light output from an input device 26 or receiving behavioral data indicating that re-outputting of the light output command is allowed or enabled from the laser control device 1. Then, when receiving a signal for ordering release of the stop state from the stop state release input unit 29, the control circuit 25 turns off the stop state flag and releases the stop state. When the stop state is released, the control circuit 25 outputs the light output command to the laser oscillator 21 when receiving the instruction to restart the laser light output from the input device 26 or receiving the behavioral data indicating that the re outputting of the light output command is allowed or enabled from the laser control device 1.

The stop state release input unit 29 is, for example, a button switch, and is provided at a position different from the input device 26, for example, separately from the input device 26. Then, the stop state release input unit 29 generates a signal for ordering release of the stop state in accordance with human operation, and outputs the signal to the control circuit 25. In this way, the stop state of the laser device 20 is released. Note that the input unit 26 and the stop state release input unit 29 may be provided in the laser control device 1.

Even when laser light output is instructed by mistake via the input device 26 when the laser light should not be output, for example, in a case in which expansion of damage in the optical fiber 3 and the like is expected, the expansion of the damage due to the laser light output can be prevented by setting the stop state. Further, the stop state release input unit 29 is prevented from being operated by mistake by providing the stop state release input unit 29 separately from the input device 26 for inputting a normal command. As a result, it is prevented that the stop state is released when the stop state should not be released.

Note that, when the signal for ordering release of the stop state is input from the stop state release input unit 29, the control circuit 25 may cause the display device 27 to display a message for prompting a final check, such as a message that a necessary check is performed before the stop state is released. Further, when the control circuit 25 receives, from the laser control device 1, a determination result or behavioral data indicating that the re-outputting of the light output command is disabled together with estimated damage information, the control circuit 25 may cause the display device 27 to display a damaged portion and a damage state represented by the estimated damage information. When the laser control device 1 outputs the determination result or the behavioral data indicating that the re-outputting of the light output command is disabled, it is estimated that the laser device 20 needs repair. However, when the estimated damaged portion and the estimated damage state are displayed on the display device 27, identifying the damaged place becomes easy, and time needed until restoration of the laser device can be reduced.

According to the modification example, even when the laser control device 1 outputs a determination result or behavioral data indicating that re-outputting of a light output command is enabled after laser light output from the laser device 20 is stopped due to detection of occurrence of an abnormality by the control circuit 25, the control circuit 25 may output a light output command for designating an output lower than a rated output or a maximum output of the laser device 20 to the laser oscillator 21 before the control circuit 25 outputs a light output command for designating the rated output or the maximum output of the laser device 20 to the laser oscillator 21. Then, the control circuit 25 may subsequently control the laser oscillator 21 in such a way as to gradually increase the laser light output to the rated output or the maximum output. Even when the laser control device 1 outputs the determination result or the behavioral data indicating that the re-outputting of the light output command is enabled, minor damage may occur in the optical fiber 3 and the like. However, according to the modification example, even when minor damage occurs in the optical fiber 3 and the like, the control circuit 25 can prevent expansion of damage at once in the laser oscillator 21, the laser optical system 22, the optical fiber 3, or the like due to a restart of the laser light output by gradually increasing intensity of the laser light output. Thus, the expansion of the damage in the laser oscillator 21, the laser optical system 22, the optical fiber 3, or the like is suppressed to minimum.

Figure 13A:
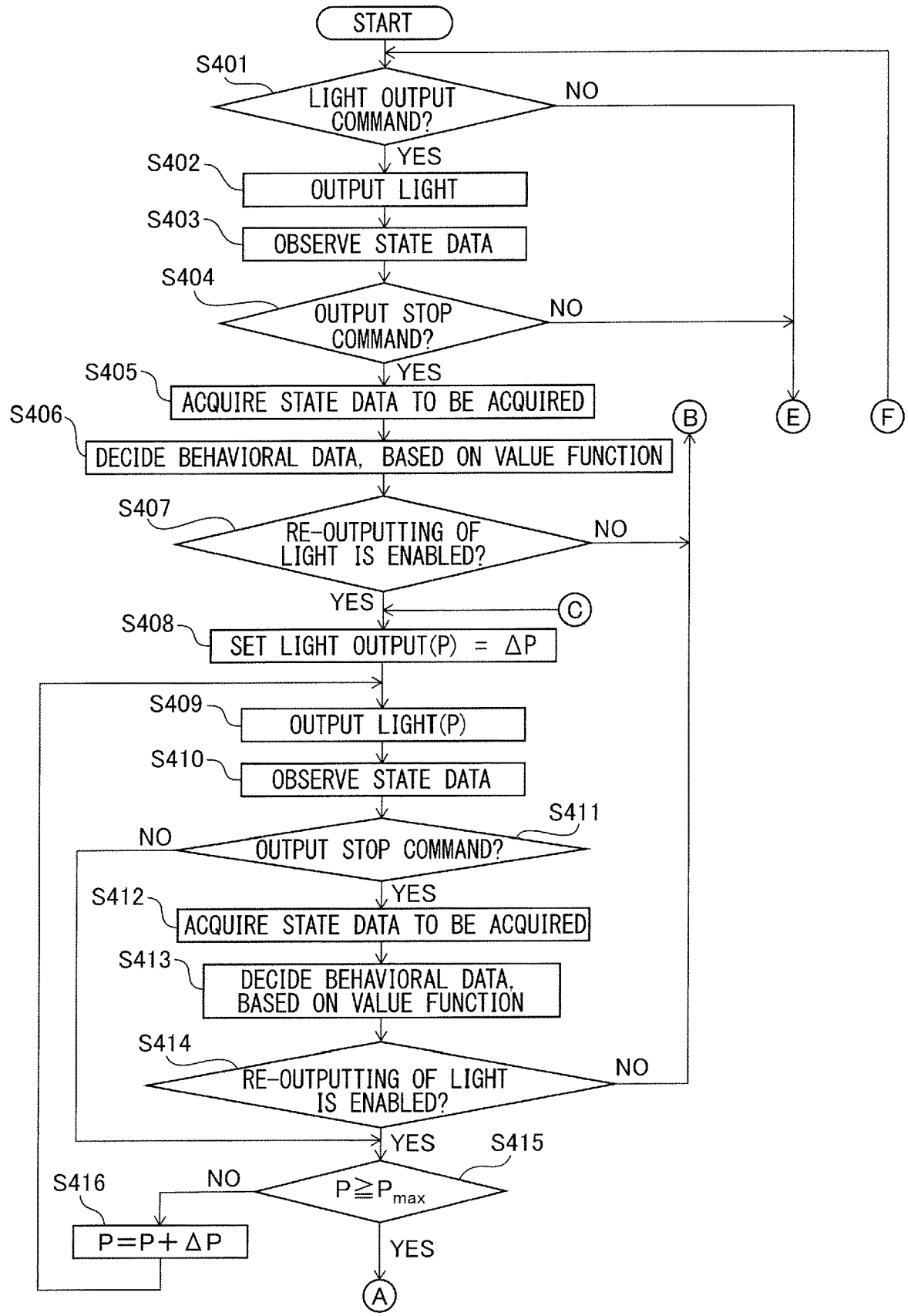
FIGS. 13A to 13C are each a flowchart illustrating one example of a learning process of a value function when the laser device according to the fifth embodiment of the present invention is controlled.
Figure 13B:
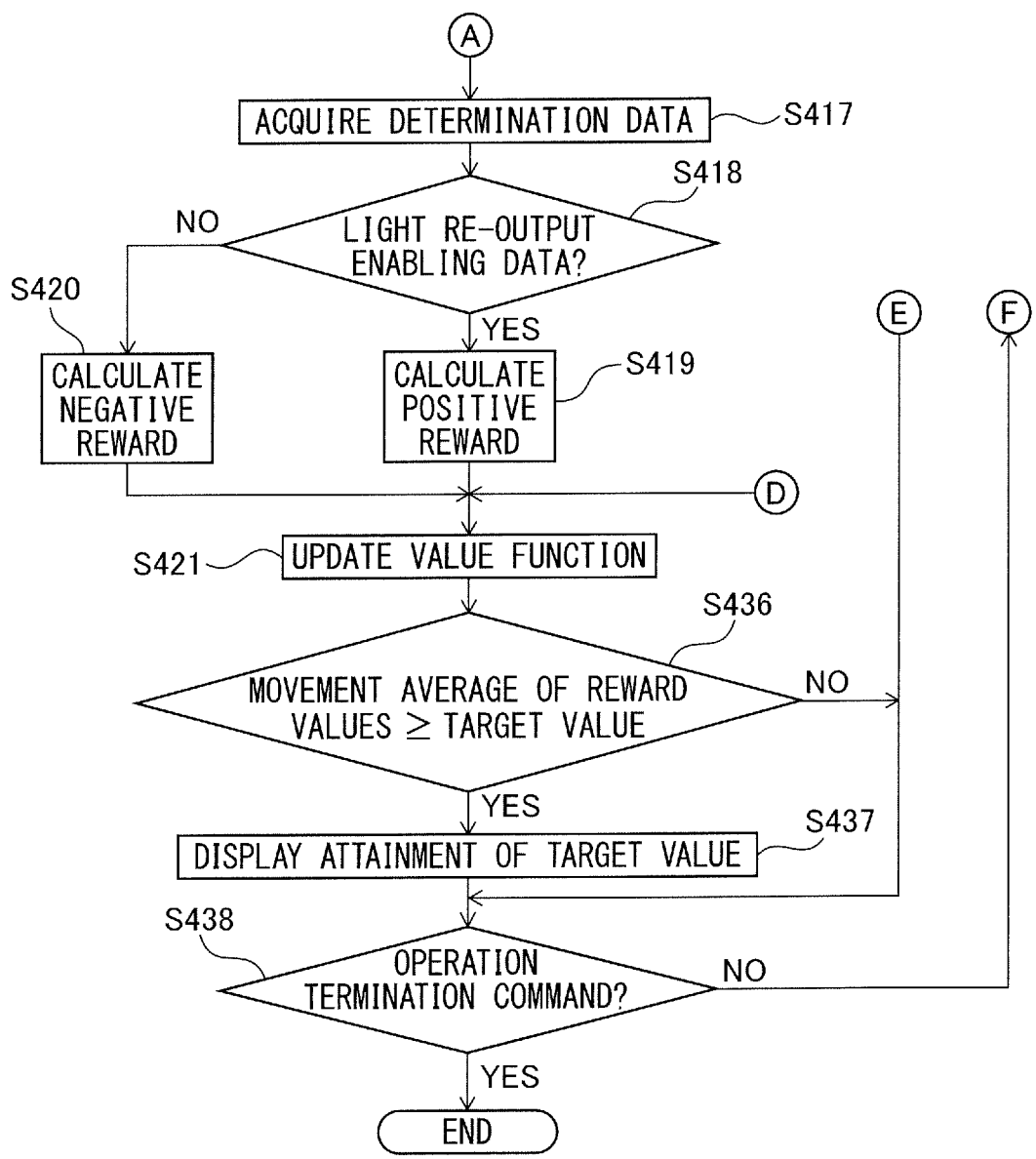
Figure 13C:
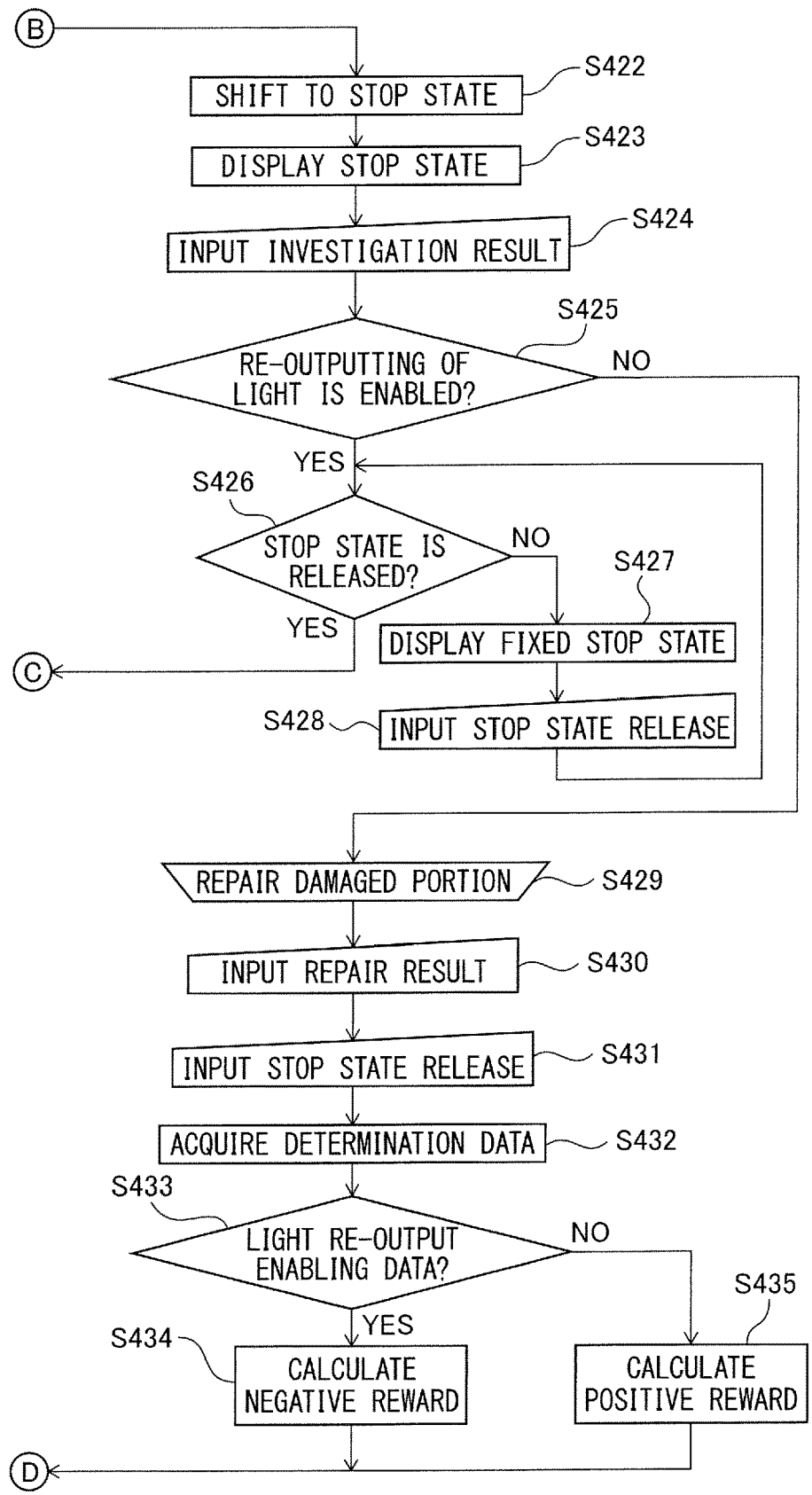

FIGS. 13A to 13C are each a flowchart illustrating one example of a learning process of a value function when the laser device according to the fifth embodiment of the present invention is controlled. Note that, in the flowcharts in FIGS. 13A to 13C, it is assumed that the laser control device 1 according to the third embodiment controls the laser device 20.

When the laser device 20 starts operating, the learning control unit 237 determines whether or not the control circuit 25 is requested to output a light output command (step S401). When the control circuit 25 is requested to output the light output command (step S401-Yes), the learning control unit 237 outputs a control signal for allowing outputting of laser light in accordance with the light output command to the control circuit 25 via the communication interface 11. Then, the control circuit 25 outputs the light output command to the laser oscillator 21, and thus the laser light is output from the laser oscillator 21 (step S402).

The state observation unit 231 always acquires, from the control circuit 25, environmental data and state data about the laser device 2 including a measurement value of a light amount of laser output light and a measurement value of a light amount of return light, and also always observes whether or not the control circuit 25 detects occurrence of an abnormality and outputs an output stop command. When the occurrence of the abnormality is detected, the state observation unit 231 acquires a signal indicating the detection of the occurrence of the abnormality from the control circuit 25 via the communication interface 11 (step S403).

The learning control unit 237 determines whether or not the control circuit 25 detects the occurrence of the abnormality, i.e., whether or not the output stop command is output via the state observation unit 231 (step S404). When the output stop command is output (step S404-Yes), the learning control unit 237 reads from the memory 12 (for example, a ring buffer), as input data, at least any of the state data and the environmental data in a predetermined period from the time going back a first predetermined period from the stop command time at which the control circuit 25 outputs the output stop command until the time after a lapse of a second predetermined period since the stop command time (step S405).

The decision making unit 232 decides behavioral data by inputting the read input data to a value function (step S406). Then, the decision making unit 232 outputs the behavioral data to the control circuit 25 via the communication interface 11. The control circuit 25 determines whether the received behavioral data is light re-output enabling data or light re-output disabling data (step S407).

When the behavioral data is determined to be the light re-output enabling data (step S407-Yes), the control circuit 25 sets a minute output value ΔP such as one one-hundredth of a maximum output Pmax, for example, to an output set value P included in the light output command (step S408). Then, the control circuit 25 outputs the light output command to the laser oscillator 21, and thus the laser light is output (step S409). Similarly to step S403; the state observation unit 231 of the laser control device 1 always acquires, from the control circuit 25, the environmental data and the state data about the laser device 2, and also always observes whether or not the control circuit 25 detects occurrence of an abnormality and outputs the output stop command. When the occurrence of the abnormality is detected, the state observation unit 231 acquires a signal indicating the detection of the occurrence of the abnormality from the control circuit 25 via the communication interface 11 (step S410). Then, similarly to step S404, the learning control unit 237 determines whether or not the output stop command is output (step S411). When the output stop command is output (step S411-Yes), similarly to step S405, the learning control unit 237 reads from the memory 12, as input data, at least any of the state data and the environmental data in the predetermined period including the stop command time (step S412). Then, similarly to step S406, the decision making unit 232 decides behavioral data by inputting the read input data to a value function (step S413). Then, the decision making unit 232 outputs the behavioral data to the control circuit 25 via the communication interface 11. Similarly to step S407, the control circuit 25 determines whether the received behavioral data is the light re-output enabling data or the light re-output disabling data (step S414). When it is determined that the behavioral data is the light re-output enabling data (step S414-Yes), the control circuit 25 determines whether or not the output set value P included in the light output command is greater than the maximum output Pmax (step S415). When it is determined that the output set value P is smaller than the maximum output Pmax (step S415-No), a value acquired by adding the minute output value ΔP to the output set value P is set to a new output set value P (step S416). Then, the control circuit 25 repeats the processing in and after step S409 in accordance with the new output set value P.

Note that, when it is determined that the output stop command is output in step S411, and when the processing in step S412 and step S413 is performed and the received behavioral data is the light re-output enabling data in step S414, the control circuit 25 may execute the processing in step S408 instead of the processing in step S415 for caution's sake, and reset the output set value to the minute output value ΔP.

As described above, even when the output stop command is output from the control circuit 25, the output set value P gradually becomes a high value by outputting, from the decision making unit 232, the behavioral data (light re-output enabling data) that the re-outputting of the light output command from the control circuit 25 is enabled, and repeating the processing from step S409 to step S416. Then, when it is determined that the output set value P has reached the maximum output Pmax in step S415 (step S415-Yes), the determination data acquisition unit 233 acquires determination data indicating that the laser light having the maximum output Pmax level can actually be re-output (step S417).

The reward calculation unit 235 determines whether the behavioral data output from the decision making unit 232 is the light re-output enabling data or the light re-output disabling data (step S418). In the flow of the control described above, the behavioral data is the light re-output enabling data (step S418-Yes), and it is clear that the behavioral data is correct on the basis of the determination data acquired in step S417. Thus, the reward calculation unit 235 calculates a reward value in such a way that the reward value becomes positive (step S419). Then, the value function update unit 236 updates the value function, based on the calculated reward value (step S421).

Note that when the learning control unit 237 determines that the output stop command is not output from the control circuit 25 in step S411 (step S411-No), the processing in and after step S415 is executed without executing steps S412 to S414.

On the other hand, when it is determined that the received behavioral data is the light re-output disabling data in step S407 or step S414 (step S407-No or step S414-No), the control circuit 25 shifts to a stop state (step S422). Note that the control circuit 25 may notify the laser control device 1 that the control circuit 25 shifts to the stop state. Then, the control circuit 25 causes the display device 27 to display a message indicating that the laser device 20 is in the stop state and an investigation is needed (step S423). In response to the laser device 20 being in the stop state, a human (person in charge) disassembles and investigates a portion of the laser device 20 suspected of damage, and investigates presence or absence of a damaged portion and a damage state. The investigation result is then input via the input device 26 (step S424). The investigation result also includes a conclusion that the re-outputting of the laser light is enabled or disabled. Thus, the learning control unit 237 determines whether to enable or not the re-outputting of the laser light in the input investigation result (step S425). When the re-outputting of the laser light is enabled (step S425-Yes), the learning control unit 237 notifies the matter wherein the re-outputting of the laser light is enabled to the control circuit 25. The control circuit 25 determines whether or not the stop state is released by referring to a stop state flag (step S426). When the stop state is released (step S426-Yes), the control circuit 25 and the laser control device 1 execute the processing in and after step S408.

On the other hand, when the stop state is not released (step S426-No), the control circuit 25 causes the display device 27 to display a message indicating that the laser device 20 is in the stop state and the stop state needs to be released in order to restart the laser light output (step S427). Then, when a command for releasing the stop state is input from the stop state release input unit 29, the control circuit 25 releases the stop state (step S428).

Thereafter, it is determined that the stop state is released in step S426, and the processing in and after step S408 is executed. Also, in the flow of the control, the determination data indicating that the laser light having the maximum output Pmax can be re-output is acquired in step S417. However, it is determined that the behavioral data output from the decision making unit 232 is the light re-output disabling data in step S418 (step S418-No). Thus, it is clear that the behavioral data is incorrect on the basis of the determination data. Thus, the reward calculation unit 235 calculates a reward value in such away that the reward value becomes negative (step S420). Then, the value function update unit 236 updates the value function in accordance with the calculated reward value (step S421).

Further, when it is determined that there-outputting of the laser light is disabled as a result of the investigation in step S425 (step S425-No), a damaged portion of the laser device 20 or the optical fiber 3 is repaired by a person in charge (step S429). Then, the repair result is input via the input device 26 (step S430). Furthermore, since the repair is completed, the command for releasing the stop state is input via the stop state release input unit 29 (step S431). Then, the determination data acquisition unit 233 acquires, as determination data, the behavioral data output from the decision making unit 232 and the repair result input from the input device 26 (step S432). Then, the reward calculation unit 235 determines whether the behavioral data output from the decision making unit 232 is the light re-output enabling data or the light re-output disabling data (step S433).

When it is determined that the behavioral data output from the decision making unit 232 in step S407 is the light re-output enabling data (step S433-Yes), the behavioral data output from the decision making unit 232 is incorrect because repair is actually needed in a light re-output disabled state of the laser device 20 or the optical fiber 3 while the behavioral data is the light re-output enabling data. Thus, the reward calculation unit 235 calculates a reward value in such a way that the reward value becomes negative (step S434).

On the other hand, when it is determined that the behavioral data output from the decision making unit 232 in step S407 is the light re-output disabling data (step S433-No), the behavioral data output from the decision making unit 232 is correct because the behavioral data is the light re-output disabling data and repair is actually needed in a light re-output disabled state of the laser device 20 or the optical fiber 3. Thus, the reward calculation unit 235 calculates a reward value in such a way that the reward value becomes positive (step S435). After step S434 or S435, the value function update unit 236 updates the value function in accordance with the calculated reward value (step S421).

Subsequent to step S421, the learning control unit 237 determines whether or not a movement average of the reward values is greater than a target value (step S436). When the movement average value of the reward is greater than the target value (step S436-Yes), it is estimated that the learning level of the value function has reached the target level. Then, the learning control unit 237 causes the display device 27 to display that the learning level has reached the target level via the communication interface 11 (step S437). After that, steps of acquiring determination data and calculating a reward may be omitted.

Thereafter, the learning control unit 237 determines whether or not the operation termination command is output to the laser control device 20 (step S438). Further, even when outputting of the light output command is not required in step S401 (step S401-No), the learning control unit 237 may execute the processing in step S438. When the operation termination command is output (step S438-Yes), the laser control device 1 terminates the operation.

On the other hand, when the operation termination command is not output (step S438-No), the laser control device L and the control circuit 25 repeat the processing in and after step S401. Note that, when the light output command is not output to the laser device 20 in step S401 and the operation termination command is not output in step S438, the laser control device 1 and the control circuit 25 wait until any of the light output command and the operation termination command is output.

As described above, when the control circuit of the laser device according to the present embodiment acquires a determination result or behavioral data indicating that the re-outputting of the light output command from the laser control device is enabled after the control circuit detects occurrence of an abnormality and temporarily stops the laser light output from the laser oscillator, the control circuit controls the laser oscillator in such a way as to gradually increase the laser light output from a minute output to a rated output or a maximum output. Thus, even when the laser control device outputs the determination result or the behavioral data indicating that the re-outputting of the light output command is enabled in a case in which minor damage occurs in the optical fiber and the like, expansion of damage at once in the optical fiber and the like due to a restart of the laser light output can be prevented by gradually increasing the laser light output. As a result, the expansion of the damage in the optical fiber and the like is suppressed to minimum.

Further, the stop state release input unit 29 being operated by mistake is prevented by providing, the stop state release input unit separately from the input device for inputting a normal command. As a result, the stop state is prevented from being released when it should not be released.

Next, a sixth embodiment will be described. A laser device according to the sixth embodiment further includes a state data recording unit that stores state data and environmental data in the latest certain period. Then, when occurrence of an abnormality is detected and laser light output is stopped, the laser device transmits, to a laser control device, state data and environmental data in a predetermined period including the stop time of the laser light output, which are stored in the state data recording unit.

Figure 14:
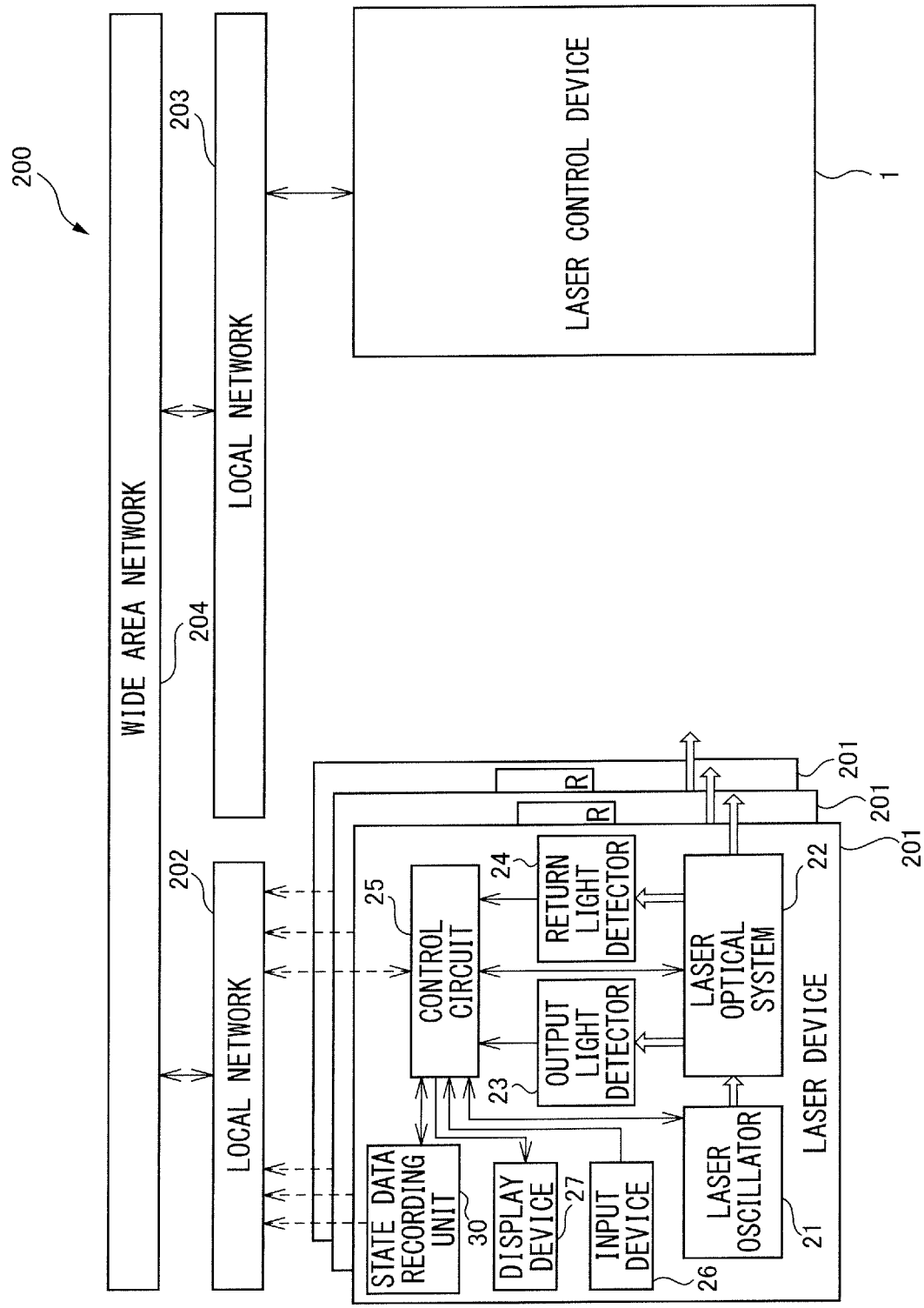
FIG. 14 is a schematic configuration diagram of a laser control system including a laser device according to a sixth embodiment of the present invention.

FIG. 14 is a schematic configuration diagram of a laser control system including the laser device according to the sixth embodiment of the present invention. A laser control system 200 according to the present embodiment includes at least one laser device 201 and a laser control device 1. Each laser device 201 is communicably connected to the laser control device 1 via local networks 202 and 203 and a wide area network 204. The laser control device 1 can be any of the laser control devices in the embodiments described above. Further, the local networks 202 and 203 can be similar to the local network 103 illustrated in FIG. 11. Similarly, the wide area network 204 can be similar to the wide area network 102 illustrated in FIG. 11. Note that, in FIG. 14, a connection signal line indicated by a broken line represents that a connection is not always established and is established when necessary.

The laser device 201 according to the present embodiment is different from the laser device 2 illustrated in FIG. 1 in that the laser device 201 includes a state data recording unit 30. Then, hereinafter, the state data recording unit 30 and a related portion thereof will be described. Another component of the laser device 201 and each component of the laser control device may be referred to the description of the corresponding component in each of the embodiments described above.

The state data recording unit 30 includes, for example, a ring buffer. Then, each time a control circuit 25 acquires state data and environmental data, the control circuit 25 writes the state data and the environmental data to the state data recording unit 30. In other words, the latest state data and the latest environmental data are written to the state data recording unit 30 on a real-time basis. Then, when a volume of the state data and the environmental data recorded in the state data recording unit 30 exceeds a memory capacity of the state data recording unit 30, the oldest state data and the oldest environmental data are overwritten in order. In this way, the state data and the environmental data in the latest certain period are recorded in the state data recording unit 30. Note that the certain period is set to equal to or greater than a predetermined period between the time going back a first predetermined period from the stop command time at which the control circuit 25 detects occurrence of an abnormality and outputs an output stop command and the time after a lapse of a second predetermined period since the stop command time.

The control circuit 25 stops writing of the state data and the environmental data to the state data recording unit 30 after the lapse of the second predetermined period since the control circuit 25 detects the occurrence of the abnormality and outputs the output stop command to a laser oscillator 21 as in each of the embodiments described above. In this way, the state data and the environmental data in the predetermined period described above are recorded in the state data recording unit 30.

Further, in a case in which a connection between the laser device 201 and the laser control device 1 is not established when the laser device 201 stops the laser light output, and the state data and the environmental data in the predetermined period described above are recorded in the state data recording unit 30, the control circuit 25 executes processing of establishing the connection between the laser device 201 and the laser control device 1 to establish the connection between the laser device 201 and the laser control device 1. Note that, when a signal line that connects between the laser device 201 and the local network 202 is physically disconnected, the control circuit 25 may execute the processing of establishing the connection described above after the signal line is connected. Then, when the connection is established, the control circuit 25 transmits the state data and the environmental data in the predetermined period read from the state data recording unit 30 to the laser control device 1. Note that, in a case in which the connection between the laser device 201 and the laser control device 1 is established when the state data and the environmental data in the predetermined period described above are recorded in the state data recording unit 30, the control circuit 25 may immediately transmit the state data and the environmental data in the predetermined period read from the state data recording unit 30 to the laser control device 1. Then, the laser control device 1 trains a classifier or determines whether to enable or disable the re-outputting of the light output command by using the received state data and the received environmental data in the predetermined period.

According to the present embodiment, even when communication between the laser device and the laser control device is not established, and the laser device cannot transmit the state data and the environmental data to the laser control device on a real-time basis, the laser device can transmit the state data and the environmental data before and after occurrence of an abnormality is detected in the laser device and the laser light output is stopped.

Note that only input data used for an input to the classifier among the state data and the environmental data in the predetermined period may be recorded in the state data recording unit 30. In this case, when the connection between the laser device 201 and the laser control device 1 is established, the control circuit 25 may transmit the input data in the predetermined period read from the state data recording unit 30 to the laser control device 1.

Next, a seventh embodiment will be described. A laser device according to the seventh embodiment stores data representing a classifier trained by the laser control device according to any of the embodiments described above. Then, by executing processing of a determination unit or a decision making unit by using the data, a control circuit itself of the laser device determines whether to enable or disable re-outputting of alight output command after occurrence of an abnormality is detected and laser light output is temporarily stopped.

Figure 15:
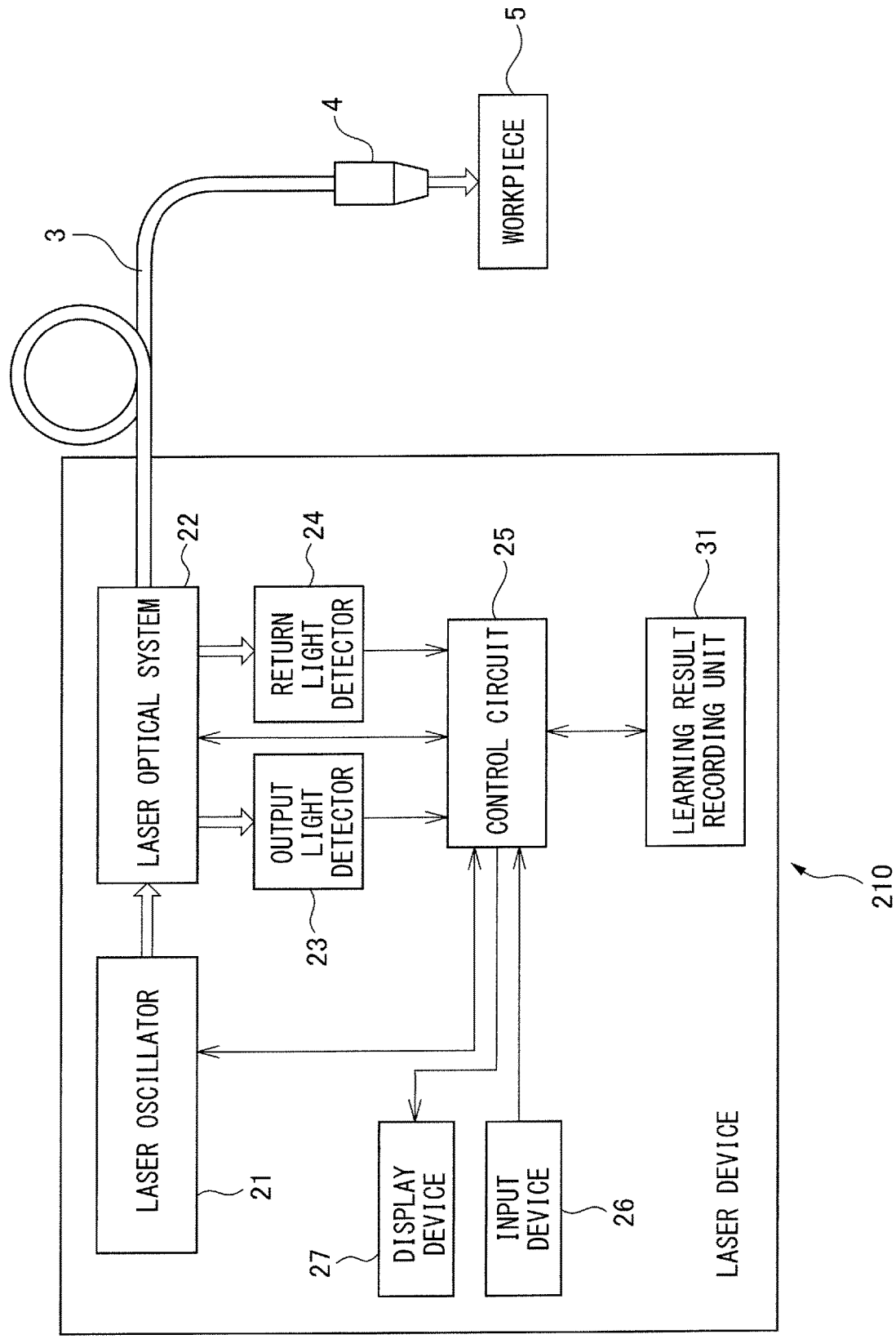
FIG. 15 is a schematic configuration diagram of a laser device according to a seventh embodiment of the present invention.

FIG. 15 is a schematic configuration diagram of the laser device according to the seventh embodiment of the present invention. A laser device 210 according to the present embodiment includes a laser oscillator 21, a laser optical system 22, an output light detector 23, a return light detector 24, a control circuit 25, an input device 26, a display device 27, and a learning result recording unit 31. Then, laser light output from the laser oscillator 21 propagates through the laser optical system 22 and an optical fiber 3, and is irradiated to a workpiece (processing object) 5 from a processing head 4. Note that the laser device 210 may further include the stop state release input unit illustrated in the fifth embodiment separately from the input device 26. The laser device 210 according to the present embodiment is different from the laser device 2 illustrated in FIG. 1 in that the laser device 210 includes the learning result recording unit 31 and in a part of processing by the control circuit 25. Then, hereinafter, the learning result recording unit 31 and processing of the control circuit 25 will be described. Another component of the laser device 210 may be referred to the description of the corresponding component in each of the embodiments described above.

The learning result recording unit 31 includes, for example, a non-volatile semiconductor memory circuit, or a magnetic recording medium and an access device of the magnetic recording medium. Then, the learning result recording unit 31 stores data representing a classifier trained by the laser control device according to any of the embodiments described above. For example, the learning result recording unit 31 stores data representing a learning model trained by the laser control device according to the first or second embodiment, or data representing a value function trained by the laser control device according to the third embodiment. Note that the data representing the classifier includes not only data representing a configuration of the classifier (for example, data for prescribing a computation executed by a neuron of each layer of a neural network, data representing a support vector of a support vector machine, etc.), but also an application program for executing processing related to the classifier.

The control circuit 25 determines whether to enable or disable the re-outputting of the light output command by using the data representing the classifier stored in the learning result recording unit 31 and the input data among the state data and the environmental data in the predetermined period described above, after the control circuit 25 detects occurrence of an abnormality, outputs a light output stop command to the laser oscillator, and laser light output is stopped. In other words, when data representing a learning model is stored in the learning result recording unit 31, the control circuit 25 executes, by using the data, processing of the state observation unit and the determination unit in the processor of the laser control device in the first embodiment or the second embodiment. Further, when data representing a value function is stored in the learning result recording unit 31, the control circuit 25 may execute, by using the data, processing of the state observation unit and the decision making unit in the processor of the laser control device in the third embodiment. Further, in a case in which the laser device 210 includes the stop state release input unit, the control circuit 25 may, for example, turn on a stop state flag held as an internal parameter, and shift the laser device 210 to a stop state when the control circuit 25 detects occurrence of an abnormality, similarly to the fifth embodiment. Then, when an operation of releasing the stop state is performed via the stop state release input unit, the control circuit 25 may turn off the stop state flag and release the stop state of the laser device 210.

In this way, the laser device itself can appropriately determine whether to enable or disable the re-outputting of the light output command by holding the data about the trained classifier as usable by the laser device itself. Therefore, even when there is no laser control device as in each of the embodiments described above or a network environment is incomplete, and the laser device is installed in a place in which the laser device cannot communicate with the laser control device, the laser device can suppress expansion of damage in the optical fiber and the like.

Furthermore, the data representing the trained classifier may also be previously stored in the memory 12 of the laser control device in the first to sixth embodiments. In this case, for example, the classifier may be previously trained by another laser control device. Then, in this case, processing related to training of the classifier may be omitted in the processor 13 of the laser control device. In other words, when a learning model is used as the classifier as in the first embodiment or the second embodiment, the processor 13 may execute the processing of the state observation unit and the determination unit. Further, when a value function is used as the classifier as in the third embodiment, the processor 13 may execute the processing of the state observation unit and the decision making unit.

Note that, in each of the embodiments or the modification example described above, the classifier may output, to input data, a prediction result of whether or not damage in the laser optical system including the laser oscillator or the optical fiber expands by re-outputting laser light. Outputting the prediction result indicating that the damage in the laser optical system including the laser oscillator or the optical fiber expands is substantially synonymous with outputting a determination result indicating that re-outputting of laser light is disabled. Further, outputting the prediction result indicating that the damage in the laser optical system including the laser oscillator and the optical fiber does not expand is substantially synonymous with outputting a determination result indicating that re-outputting of laser light is enabled.

All examples and conditional language recited herein are intended to have teaching purpose to aid the reader in understanding the concepts contributed by the inventor to the present invention and furthering the art, and are to be construed as being without limitation to such specifically recited examples and conditions nor does the organization of such examples in the specification related to showing of the superiority and inferiority of the invention. Although the embodiment of the present invention is described in detail, it is to be understood that various changes, substitutions, and modifications can be made hereto without departing from the spirit and scope of the invention.

What is claimed is:

1. A laser control device that controls a laser device including a laser oscillator that outputs laser light, an output light detector that detects a light amount of laser light output from the laser oscillator, a return light detector that detects a light amount of return light propagating in a direction opposite to a propagation direction of the laser light through a laser optical system including an optical fiber that propagates the laser light, and a control circuit that controls the laser oscillator, the laser control device comprising:
    a processor configured to determine, when the control circuit detects occurrence of an abnormality in the laser oscillator or the laser optical system and stops laser output from the laser oscillator, whether to enable or disable re-outputting of laser light from the laser oscillator by inputting input data being at least a part of state data indicating a state of the laser device and environmental data indicating a state of an environment in which the laser device and the optical fiber are installed in a predetermined period including a stop time of the laser output, to a classifier that determines whether to enable or disable re-outputting of laser light from the laser oscillator, based on the input data; and
    control the control circuit in accordance with the determination result, wherein the state data and the input data in the predetermined period include at least one of time-series data about a light amount of the laser light and time-series data about a light amount of the return light in the predetermined period.

2. The laser control device according to claim 1, wherein the processor is further configured to train the classifier, based on the input data at each of a plurality of the stop times.

3. The laser control device according to claim 2, wherein the processor is further configured to acquire, for each of the plurality of the stop times, label data indicating that re-outputting of laser light is disabled when damage in the laser oscillator or the laser optical system expands by re-outputting laser light by the laser oscillator after the stop time, and, on the other hand, indicating that re-outputting of laser light is enabled when damage in the laser oscillator and the laser optical system does not expand even by re-outputting laser light by the laser oscillator after the stop time,
wherein the processor trains the classifier in accordance with a supervised learning technique, based on a pair of the input data and the label data at each of the plurality of the stop times.

4. The laser control device according to claim 3, further comprising:
a breakage device that can break the optical fiber in a predetermined section of the optical fiber,
wherein the processor acquires, as data indicating that re-outputting of laser light is disabled, the label data at a stop time at which occurrence of the abnormality is detected by breaking the optical fiber by the breakage device, among the plurality of the stop times.

5. The laser control device according to claim 2, wherein the processor is further configured to acquire, for each of the plurality of the stop times, determination data indicating whether or not controlling the laser oscillator by the control circuit is correct in accordance with a determination result of whether to enable or disable re-outputting of laser light, which is output from the classifier, by inputting the input data in the predetermined period including the stop time,
wherein the processor trains, for each of the plurality of the stop times, the classifier in accordance with a reinforcement learning technique, based on the determination data at the stop time, and
it is determined that the determination data is correct, when the determination result indicates that re-outputting of laser light is enabled and damage in the laser oscillator and the laser optical system does not expand even by re-outputting laser light from the laser oscillator, or when the determination result indicates that re-outputting of laser light is disabled and damage in the laser oscillator or the laser optical system expands by re-outputting laser light from the laser oscillator.

6. The laser control device according to claim 2, further comprising:
a communication circuit configured to be able to communicate with a plurality of the laser devices connected via a first communication network and communicate with another laser control device connected via a second communication network that connects the first communication network to another communication network to which the another laser control device is connected,
wherein the processor trains the classifier, based on the input data acquired via the communication unit from any one or more of the plurality of laser devices connected via the first communication network, and determines, for each of the plurality of laser devices connected via the first communication network, whether to enable or disable re-outputting of laser light from the laser oscillator of the laser device by inputting the input data acquired from the laser device to the classifier, and
the classifier is shared with the another laser control device.

7. The laser control device according to claim 1, wherein
the classifier further outputs at least one of a damaged portion and a damage state being estimated in the laser oscillator or the laser optical system when the classifier outputs a determination result indicating that re-outputting of laser light is disabled, and
the processor causes a display device to display the at least one of the damaged portion and the damage state being estimated.

8. The laser control device according to claim 7, wherein the processor is further configured to train the classifier, based on the input data at each of the plurality of the stop times and the at least one of the damaged portion and the damage state.

9. The laser control device according to claim 1, wherein
the processor controls the control circuit in such a way as to stop outputting of the laser light when the classifier outputs a determination result indicating that re-outputting of laser light is disabled by inputting the input data in the latest certain period having a length identical to that of the predetermined period to the classifier.

10. The laser control device according to claim 1, wherein
the laser device shifts to a stop state in which laser output is not restarted when the control circuit stops laser output from the laser oscillator, and
the laser control device further includes
an input device for operating the laser device, and
a stop state release input device that is provided separately from the input device, and receives an operation for releasing the stop state after the control circuit stops laser output from the laser oscillator.

11. A laser control system comprising a laser device, and a laser control device that can communicate with the laser device via a communication network, wherein
the laser device includes:
a laser oscillator that outputs laser light;
an output light detector that detects a light amount of laser light output from the laser oscillator;
a return light detector that detects a light amount of return light propagating in a direction opposite to a propagation direction of the laser light through a laser optical system including an optical fiber that propagates the laser light;
a control circuit that controls the laser oscillator; and
a memory configure to store, when the control circuit detects occurrence of an abnormality in the laser oscillator or the laser optical system and stops laser output from the laser oscillator, input data being at least a part of state data indicating a state of the laser device and environmental data indicating a state of an environment in which the laser device and the optical fiber are installed in a predetermined period including a stop time of the laser output, the control circuit transmits the input data stored in the memory to the laser control device, when communication between the laser device and the laser control device via the communication network is established, the laser control device includes
- a processor configured to determine whether to enable or disable re-outputting of laser light from the laser oscillator by inputting the input data to a classifier that determines whether to enable or disable re-outputting of laser light from the laser oscillator; and
- control the control circuit in accordance with the determination result, and wherein the state data and the input data in the predetermined period include at least one of time-series data about alight amount of the laser light and time series data about a light amount of the return light in the predetermined period.

12. A laser device, comprising:
a laser oscillator that outputs laser light;
an output light detector that detects a light amount of laser light output from the laser oscillator;
a return light detector that detects a light amount of return light propagating in a direction opposite to a propagation direction of the laser light through a laser optical system including an optical fiber that propagates the laser light; and
a control circuit that determines, when the control circuit detects occurrence of an abnormality in the laser oscillator or the laser optical system and stops laser output from the laser oscillator, whether to enable or disable re-outputting of laser light from the laser oscillator by inputting input data being at least a part of state data indicating a state of the laser device and environmental data indicating a state of an environment in which the laser device and the optical fiber are installed in a predetermined period including a stop time of the laser output, to a classifier that determines whether to enable or disable re-outputting of laser light from the laser oscillator, based on the input data, and that controls whether or not the laser oscillator re-outputs laser light in accordance with the determination result, wherein
the state data and the input data in the predetermined period include at least one of time-series data about a light amount of the laser light and time-series data about a light amount of the return light in the predetermined period.

13. The laser device according to claim 12, wherein
the laser device shifts to a stop state in which laser output is not restarted when the control circuit stops laser output from the laser oscillator, and
the laser device further comprises:
an input device for operating the laser device; and
a stop state release input device that is provided separately from the input device, and receives an operation for releasing the stop state after the control circuit stops laser output from the laser oscillator.

14. A laser control method of controlling a laser device including a laser oscillator that outputs laser light, an output light detector that detects a light amount of laser light output from the laser oscillator, a return light detector that detects a light amount of return light propagating in a direction opposite to a propagation direction of the laser light through a laser optical system including an optical fiber that propagates the laser light, and a control circuit that controls the laser oscillator, the laser control method comprising:
determining, when the control circuit detects occurrence of an abnormality in the laser oscillator or the laser optical system and stops laser output from the laser oscillator, whether to enable or disable re-outputting of laser light from the laser oscillator by inputting input data being at least a part of state data indicating a state of the laser device and environmental data indicating a state of an environment in which the laser device and the optical fiber are installed in a predetermined period including a stop time of the laser output, to a classifier that determines whether to enable or disable re-outputting of laser light from the laser oscillator, based on the input data; and
controlling the control circuit in accordance with the determination result, wherein
the state data and the input data in the predetermined period include at least one of time-series data about a light amount of the laser light and time-series data about a light amount of the return light in the predetermined period.

15. The laser control method according to claim 14, further comprising:
training the classifier, based on the input data at each of the plurality of stop times.

* * * * *